(12) United States Patent
Kirshenbaum et al.

(10) Patent No.: US 7,797,282 B1
(45) Date of Patent: Sep. 14, 2010

(54) SYSTEM AND METHOD FOR MODIFYING A TRAINING SET

(75) Inventors: Evan R. Kirshenbaum, Mountain View, CA (US); George H. Forman, Port Orchard, WA (US); Henri J. Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1378 days.

(21) Appl. No.: 11/241,082

(22) Filed: Sep. 29, 2005

(51) Int. Cl.
*G06F 7/00* (2006.01)
(52) U.S. Cl. .................. 707/651; 707/649; 707/681; 707/692
(58) Field of Classification Search ............ 707/2, 707/3, 5, 6, 649, 651, 681, 692; 370/231; 702/179; 705/2
See application file for complete search history.

(56) References Cited

U.S. PATENT DOCUMENTS

| | | | |
|---|---|---|---|
| 5,819,258 A | 10/1998 | Vaithyanathan | |
| 5,903,884 A | 5/1999 | Lyon | |
| 5,930,764 A | 7/1999 | Melchione | |
| 5,943,670 A | 8/1999 | Prager | |
| 6,003,027 A | 12/1999 | Prager | |
| 6,038,560 A | 3/2000 | Wical | |
| 6,170,025 B1 | 1/2001 | Drottar | |
| 6,173,279 B1 | 1/2001 | Levin | |
| 6,418,434 B1 | 7/2002 | Johnson | |
| 6,442,545 B1 * | 8/2002 | Feldman et al. ............ 707/6 |
| 6,675,161 B1 | 1/2004 | Suchter | |
| 6,701,333 B2 | 3/2004 | Suermondt et al. | |
| 6,704,905 B2 | 3/2004 | Fukushige | |
| 6,728,690 B1 | 4/2004 | Meek | |
| 6,767,213 B2 | 7/2004 | Fleishman | |
| 6,823,323 B2 | 11/2004 | Forman et al. | |
| 6,842,751 B1 | 1/2005 | Vilalta | |
| 6,925,454 B2 | 8/2005 | Lam | |
| 6,944,616 B2 | 9/2005 | Ferguson | |
| 6,973,452 B2 | 12/2005 | Metzger | |
| 7,043,492 B1 | 5/2006 | Neal | |
| 7,051,009 B2 | 5/2006 | Suermondt | |
| 7,113,957 B1 | 9/2006 | Cohen | |
| 7,177,855 B2 | 2/2007 | Witkowski | |
| 7,184,602 B2 | 2/2007 | Cohen | |
| 7,200,606 B2 | 4/2007 | Elkan | |

(Continued)

FOREIGN PATENT DOCUMENTS

EP 0747846 12/1996

(Continued)

OTHER PUBLICATIONS

Nevin L. Zhang et al., "Hierarchical Latent Class Models for Cluster Analysis", ACM, 2004, pp. 697-723.*

(Continued)

*Primary Examiner*—Thuy N Pardo

(57) ABSTRACT

Information representing a hierarchy of categories is stored. An indication is received that a first case is either a positive case or a negative case for a first category in the hierarchy of categories. The first case is identified, by inference, as a positive case or negative case for a second category in the hierarchy based on relationship of the second category to the first category. A training set for the second category is modified based on the identification by reference.

24 Claims, 17 Drawing Sheets

U.S. PATENT DOCUMENTS

| | | | |
|---|---|---|---|
| 7,302,426 | B2 | 11/2007 | Bier |
| 7,325,005 | B2 | 1/2008 | Forman |
| 7,349,917 | B2 | 3/2008 | Forman |
| 7,437,338 | B1 | 10/2008 | Forman |
| 7,505,868 | B1 | 3/2009 | Shan |
| 2002/0083025 | A1 | 6/2002 | Robarts et al. |
| 2002/0107712 | A1 | 8/2002 | Lam |
| 2003/0154181 | A1* | 8/2003 | Liu et al. ................... 707/1 |
| 2003/0187809 | A1 | 10/2003 | Suermondt |
| 2004/0064464 | A1 | 4/2004 | Forman |
| 2004/0181554 | A1 | 9/2004 | Heckerman et al. |
| 2004/0225653 | A1* | 11/2004 | Nelken et al. ................ 707/5 |
| 2005/0096866 | A1 | 5/2005 | Shan |
| 2005/0108200 | A1* | 5/2005 | Meik et al. ................... 707/3 |
| 2005/0228774 | A1* | 10/2005 | Ronnewinkel ................ 707/2 |
| 2006/0026163 | A1 | 2/2006 | Forman |
| 2006/0092841 | A1* | 5/2006 | Lloyd et al. ................ 370/231 |
| 2006/0173559 | A1 | 8/2006 | Kirshenbaum |
| 2006/0206443 | A1 | 9/2006 | Forman |
| 2006/0248054 | A1 | 11/2006 | Kirshenbaum |
| 2007/0185901 | A1 | 8/2007 | Gates |
| 2008/0234976 | A1* | 9/2008 | Wittkowski ................ 702/179 |
| 2009/0055220 | A1* | 2/2009 | Rapaport et al. ............... 705/2 |

FOREIGN PATENT DOCUMENTS

| | | |
|---|---|---|
| EP | 0747848 | 12/1996 |

OTHER PUBLICATIONS

Carlos A. Hurtado et al., "Updating OLAP Dimensions", ACM, 1999, pp. 60-66.*

E.R Kirshenbaum et al., U.S. Appl. No. 11/211,979, entitled "Producing a Measure Regarding Cases Associated wtih an Issue After One or More Events Have Occurred," filed Aug. 25, 2005, pp. 1-51, Figs. 1-5H.

Forman et al., U.S. Appl. No. 11/080,098, entitled "A Method of, and System for, Classification Count Adjustment," filed Mar. 14, 2005, pp. 1-31, Figs. 1A-5.

Kirshenbaum et al., U.S. Appl. No. 11/118,178, entitled "Providing Training Information for Training a Categorizer," filed Apr. 29, 2005, pp. 1-39, Figs. 1-3E.

Kirshenbaum et al., U.S. Appl. No. 11/118,786, entitled "Computing a Quantification Measure Associated with Cases in a Category," filed Apr. 29, 2005, pp. 1-35, Figs. 1 -3D.

Kirshenbaum et al., U.S. Appl. No. 11/172,187, entitled "Effecting Action to Address an Issue Associated with a Category Based on Information that Enables Ranking of Categories," filed June 30, 2005, pp. 1-52, Figs. 1-5H.

U.S. Appl. No. 11/118,178, Final Rejection dated Dec. 12, 2008, pp. 1-23 and attachments.

U.S. Appl. No. 11/118,178, Office Action dated Jun. 2, 2008, pp. 1-28 and attachments.

U.S. Appl. No. 11/118,178, Office Action dated Oct. 16, 2007, pp. 1-49 and attachments.

U.S. Appl. No. 11/118,786, Examiner's Answer dated Dec. 8, 2008, pp. 1-21.

U.S. Appl. No. 11/118,786, Final Rejection dated Apr. 18, 2008, pp. 1-19 and attachments.

U.S. Appl. No. 11/118,786, Office Action dated Sep. 18, 2007, pp. 1-18 and attachments.

U.S. Appl. No. 11/364,108, filed Feb. 28, 2006 entitled "Identifying an Emerging or New Category", pp. 1-34, Figs. 1-6.

G.H. Forman et al., U.S. Appl. No. 11/393,487, entitled "Comparing Distributions of Cases Over Groups of Categories," filed Mar. 30, 2006, pp. 1-39, Figs. 1-7E.

U.S. Appl. No. 11/386,005, Office Action dated Jan. 17, 2008, pp. 1-11 and attachments.

J.Z. Shan, U.S. Appl. No. 11/118,832, entitled "Determining a Time Point Corresponding to a Chanage in Data Values Based on Fitting with respect to Plural Aggregate Value Sets." filed Apr. 29, 2005, pp. 1-26, Figs. 1-8.

J.Z. Shan, U.S. Appl. No. 11/119,037, entitled "Detecting Change in Data," filed April 29, 2005, pp. 1-26, Figs. 1-6.

Charles H. Heenan: "Manual and Technology Based Approaches to Using Classification for the Facilitation of Access to Unstructured Test" Engineering Informatics Group Department of Civil and Environmental Engineering; Stanford University, Jan. 2, 2002, xpoo2395544; p. 36, fig. 20, p. 72, paragraphs overall, review.

Quin Shun et al.: "Integration of Manual and Automatic Text Categorization—A Categorization Workbench for Text-Based Email and Spam" KI 2004: Advances in Artificial Intelligence, vol. 3238/2004, Jan. 6, 2005; pp. 156-167, XPOO2395556.

Effect of Overlapping Projections on Reconstruction Image Quality in Multipinhole SPECT, Vunckx et al., IEEE Trans Med Imaging. 2008; 27 (7), pp. 972-983.

Segmentation and Quantification of Blood Vessels in 3D Images using a Right Generalized Cylinder State Model, Florez-Valencia et al., 2006 IEEE Int. Conference on Image Processing, Oct. 8-11, 2006, pp. 2441-2444.

U.S. Appl. No. 11/172,187, Office Action dated Dec. 8, 2008, pp. 1-9 and attachments.

Kirshenbaum et al., U.S. Appl. No. 11/211,979, entitled "Producing a Measure Regarding Cases Associated with an Issue After One or More Events Have Occurred," filed Aug. 25, 2005, pp. 1-51, Figs. 1-5H.

U.S. Appl. No. 11/172,187 Notice of Allowance dated Jun. 5, 2009 (pp. 1-6 and attachments).

* cited by examiner

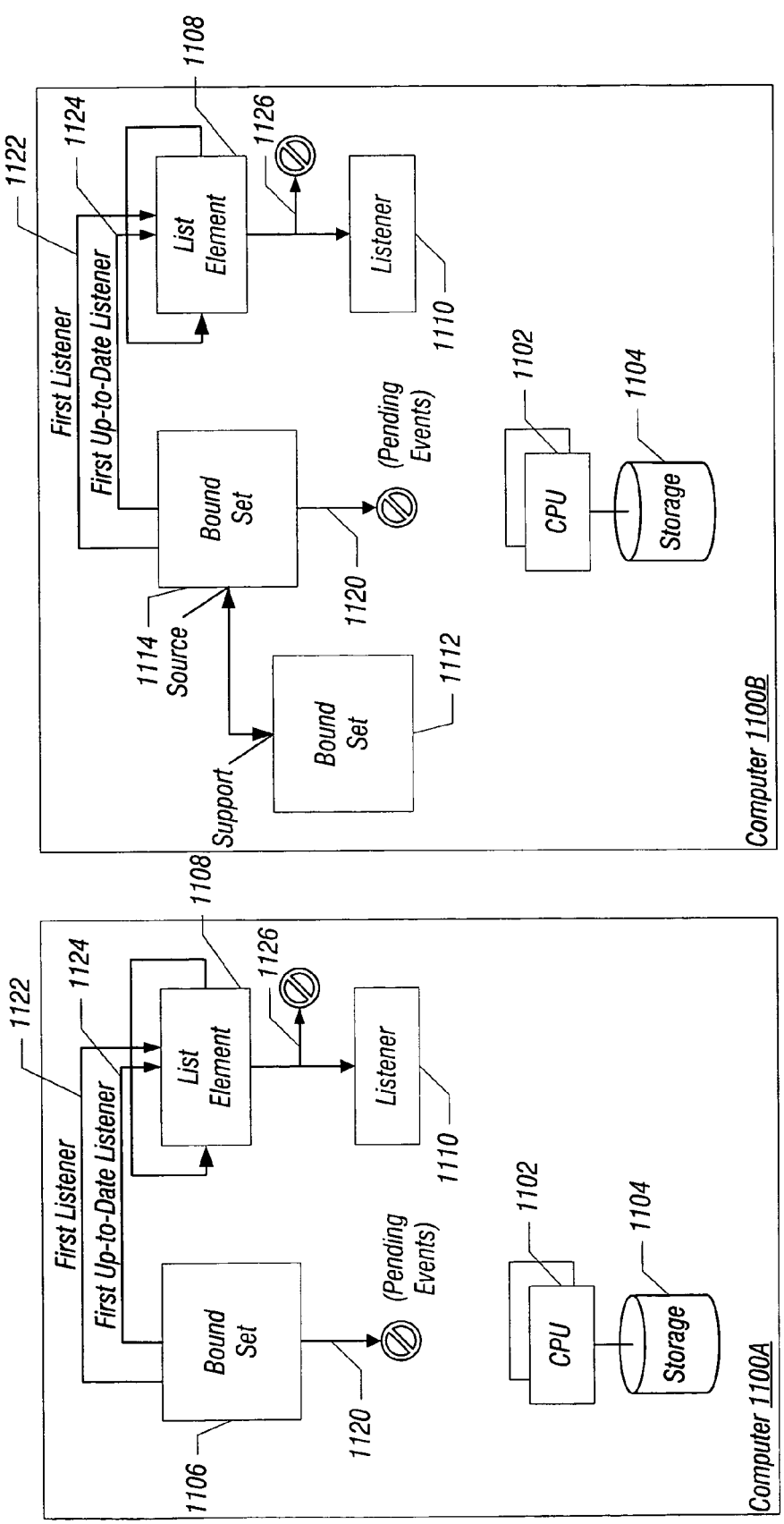

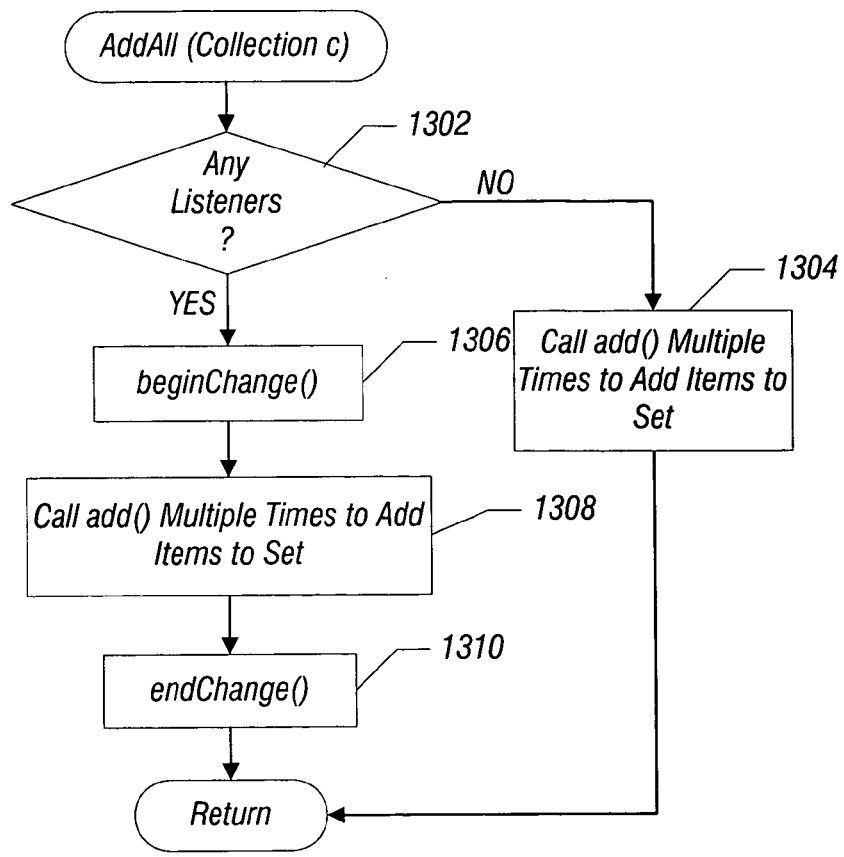
FIG. 15
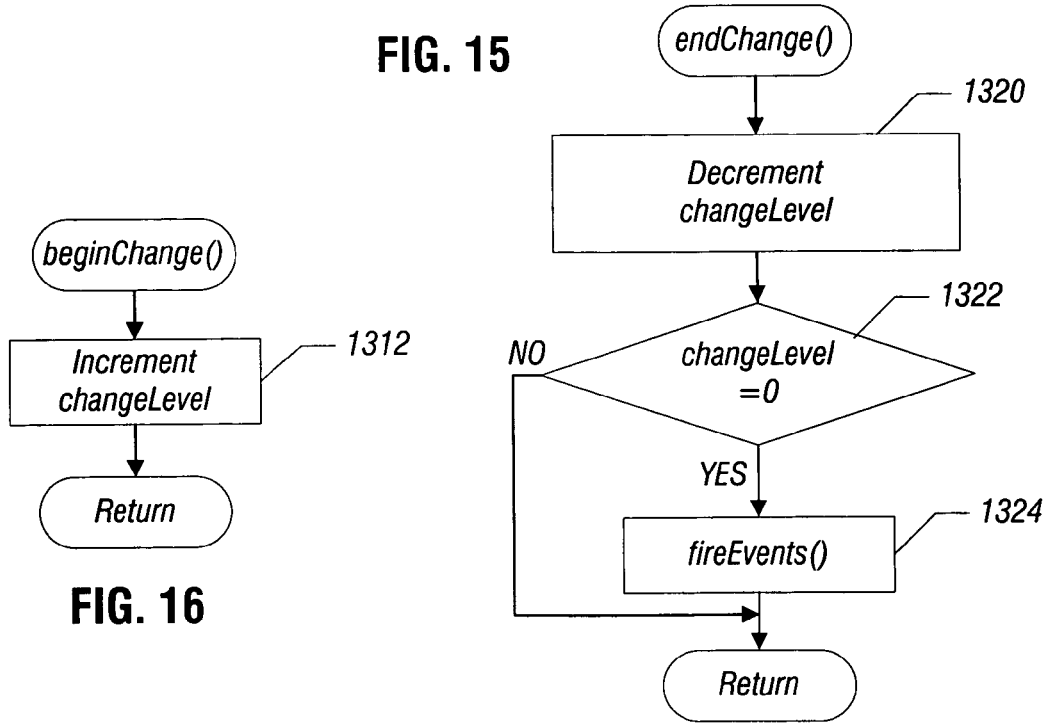
FIG. 16
FIG. 17

ITERATION 1:

FIRST UP-TO-DATE LISTENER IS NULL;
X IS FIRST LISTENER
(1) p ← X
(2) FIRST LISTENER ← Y
   FIRST UP-TO-DATE LISTENER ← X
(3) e ← E1
(4) E1 IS FIRST, SO DO NOT REMOVE
(5) X'S EVENT ← NULL
(6) NOT UP-TO-DATE, BUT Y's EVENT IS NOT NULL; DO NOTHING
(7) PROCESS E1 BECAUSE WORTH RAISING

ITERATION 2:

X IS FIRST UP-TO-DATE LISTENER;
Y IS FIRST LISTENER
(1) p ← Y
(2) FIRST LISTENER ← Z
   FIRST UP-TO-DATE LISTENER REMAINS X
(3) e ← E2
(4) E2 IS NOT FIRST, SO REMOVE E1
(5) Y'S EVENT ← NULL
(6) NOT UP-TO-DATE, AND Z'S EVENT IS NULL; SET LISTENER Z'S EVENT TO E2
(7) PROCESS E2 BECAUSE WORTH RAISING

IN STEP (7), ITEM C REMOVED FROM BOUND SET, WHICH CAUSES:
    -CREATE E3 ASSOCIATED WITH X
    -SET FIRST UP-TO-DATE LISTENER TO NULL
    -REMOVE C FROM E2 { }
    -CALL fireEvents( )

ITERATION 1 (NESTED LEVEL):

FIRST UP-TO-DATE LISTENER IS NULL;
Z IS FIRST LISTENER
(1) p ← Z
(2) FIRST LISTENER ← X
   FIRST UP-TO-DATE LISTENER ← Z
(3) e ← E2
(4) E2 IS FIRST, SO DO NOT REMOVE
(5) Z'S EVENT ← NULL

ITERATION 1 (NESTED LEVEL) cont'd (6) NOT UP-TO-DATE, BUT X'S EVENT IS NOT NULL; DO NOTHING
(7) DO NOT PROCESS E2 BECAUSE NOT WORTH RAISING

ITERATION 2 (NESTED LEVEL):

Z IS FIRST UP-TO-DATE LISTENER;
X IS FIRST LISTENER
(1) p ← X
(2) FIRST LISTENER ← Y
   FIRST UP-TO-DATE LISTENER REMAINS Z
(3) e ← E3
(4) E3 IS NOT FIRST, SO REMOVE E2
(5) X'S EVENT ← NULL
(6) NOT UP-TO-DATE, AND Y's EVENT IS NULL; SET Y'S EVENT TO E3
(7) PROCESS E3 BECAUSE WORTH RAISING

ITERATION 3 (NESTED LEVEL):

Z IS FIRST UP-TO-DATE LISTENER;
Y IS FIRST LISTENER
(1) p ← Y
(2) FIRST LISTENER ← Z
   FIRST UP-TO-DATE LISTENER REMAINS Z
(3) e ← E3
(4) E3 IS FIRST, SO DO NOT REMOVE
(5) Y'S EVENT ← NULL
(6) UP-TO-DATE
(7) PROCESS E3 BECAUSE WORTH RAISING

EXIT LOOP

FIG. 21

SYSTEM AND METHOD FOR MODIFYING A TRAINING SET

BACKGROUND

Categorizers (also referred to as classifiers) are often used in data mining applications, where data contained in a database (or multiple databases) is analyzed and used for various purposes (such as to determine customer purchasing habits and preferences or for other purposes). A categorizer looks at a data item (e.g., article, product, customer, stock, support call, and so forth), and decides, based on information associated with the item (e.g., text, cost, date, duration, buying history, trade volume, and so forth), whether the item should be associated with a particular category or multiple categories. The categorizer decides which of a set of potential categories most likely applies, describes, or should be associated with the data item in question. A "category" refers to a label, annotation, or some other form of identifying indicator.

A categorizer has to be trained to enable the categorizer to perform categorization tasks. To train a given categorizer, training sets are developed, where the training sets contains a set of positive training cases and a set of negative training cases for each given category. In a system that has a large number of categories, the process of developing the training sets for all of the categories can be time-consuming. Also, in many conventional systems, it is assumed that only a single category is to be associated with each case, which may prevent accurate development of training sets.

BRIEF DESCRIPTION OF THE DRAWINGS

Some embodiments of the invention are described with respect to the following figures:

FIGS. 13A-13B are block diagrams of bound sets according to some embodiments;

FIG. 15 is a flow diagram of a process performed by a software method for adding objects to a set, in accordance with an embodiment;

FIG. 16 is a flow diagram of a process performed by a software method for beginning a change of a set, according to an embodiment;

FIG. 17 is a flow diagram of a process performed by a software method for ending a change of a set, according to an embodiment;

FIG. 21 illustrates a number of iterations performed by the software method of FIG. 20, in accordance with an embodiment.

DETAILED DESCRIPTION

Figure 1:
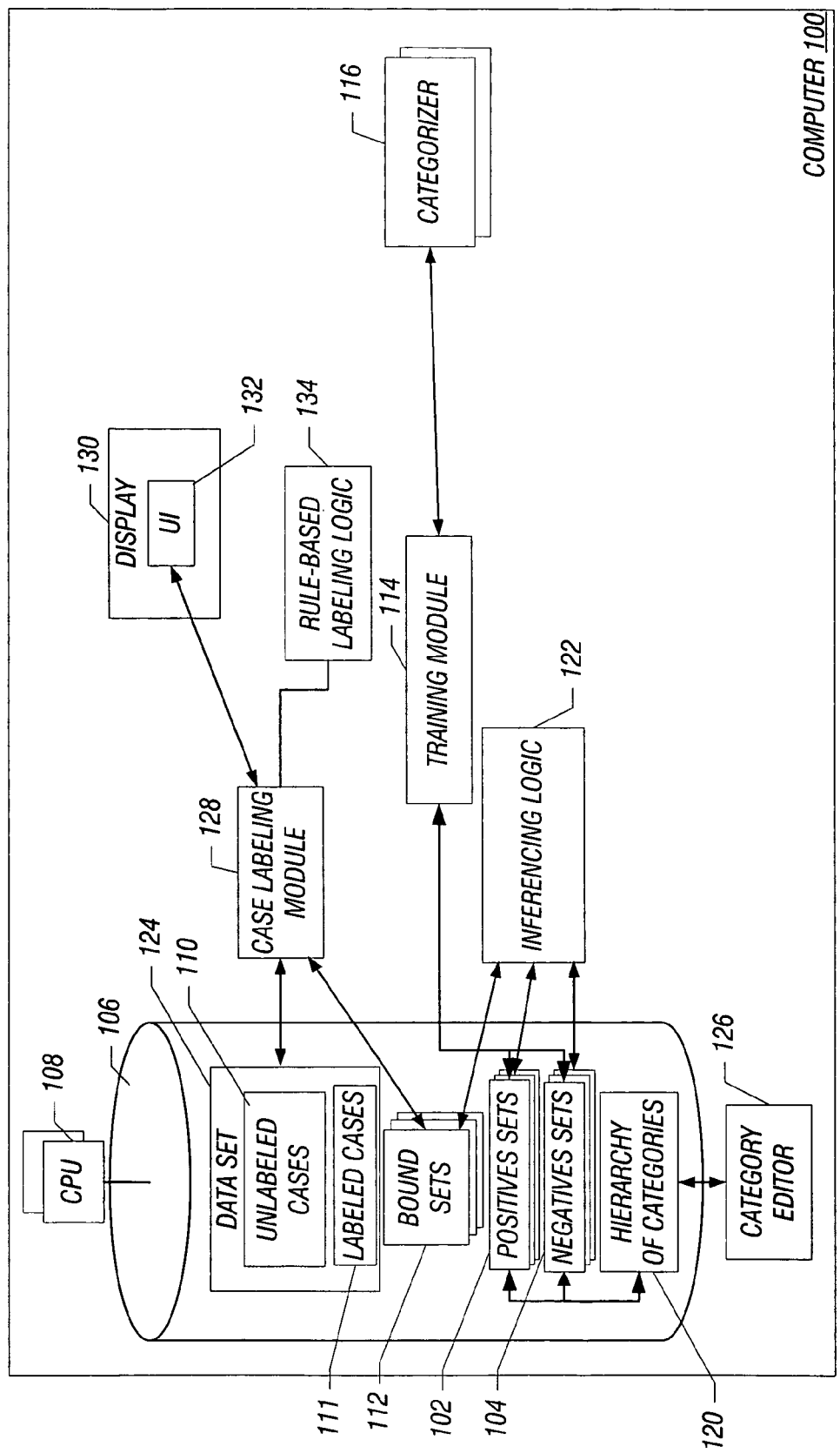
FIG. 1 is a block diagram of an example system that incorporates an embodiment of the invention.

FIG. 1 illustrates an example computer 100 in which various modules according to some embodiments of the invention are executable. The modules executable in the computer 100 enable the development of positive training sets (training sets of positive cases) 102 and negative training sets (training sets of negative cases) 104 for classifiers associated with categories in a hierarchy of categories 120. A "hierarchy" of categories refers to categories that are related to each other as parents, children, siblings, grandparents, and so forth, as discussed in greater detail below. Each category in the hierarchy 120 is associated with a respective pair of a positive training set (also referred to as a "positives set") and a negatives training set (also referred to as a "negatives set"). A positives set is a set of training cases that have been identified as belonging to the respective category. A negatives set is a set of training cases that have been identified as not belonging to the respective category.

The positives and negatives sets 102 and 104, in the hierarchy of categories 120, are stored in a storage 106, which can be persistent storage (such as magnetic or optical disk drives or non-volatile semiconductor memory devices), volatile memory (such as dynamic random access memories or static random access memories), or other types of storage devices.

In accordance with some embodiments, the positives and negatives sets 102 and 104 are "bound sets." Note that in addition to the positives and negatives sets 102, 104, other bound sets 112 (which are used to develop the positives and negatives sets) are also stored in the storage 106. A "bound set" refers to a set of items that is associated with one or more listeners that are interested in changes made to the set and which notifies these listeners when such changes occur. More generally, instead of reference to "sets," training cases can be stored in collections (such as in a positives training collection and a negatives training collection). A "bound collection" refers to a collection that is associated with one or more listeners that are interested in changes made to the collection. A collection can refer to sets, lists, trees, maps, and other data structures that provide some grouping of items. A bound collection is defined by logic (in the form of software for example).

A "listener" refers to an object, function, routine, procedure, and so forth, that monitors changes made to a set (or collection), including bound sets 112, positives sets 102, and negatives sets 104. Note that the term "listener" is not intended to imply that any particular programming language is used for implementing some embodiments. In one example, a change to one of the bound sets can be propagated to listeners (such as listeners associated with one or more categories) that have registered interest in such a change. The propagation and notification of changes is provided by inferencing logic 122, which includes various data structures and routines for enabling the propagation and notification of changes among sets of multiple categories.

Also stored in storage 106 is a data set 124 that contains labeled cases 111 and unlabeled cases 110. A "case" refers to any item that is to be categorized into one or more of the hierarchy of categories 120. Examples of cases include reports or summaries generated by customer support representatives in receiving customer calls, reports or summaries regarding various events associated with an organization, products, customers, or any item representing any other type of event or thing for which categorization is desired.

Labeled cases 111 are cases that have been labeled with respect to one or more categories, whereas unlabeled cases 110 are cases that have not been labeled with respect to any category. A case is labeled with a category when the case has been identified as belonging (or not belonging) to the category.

Cases can be labeled for categories according to any of a number of techniques. In one example, cases can be displayed in a user interface (UI) 132 of a display 130 to allow a user to label a case with respect to one or more categories. A case can be labeled as belonging to a particular category (or plural particular categories), or the case can be labeled as not belonging to a particular category (or plural particular categories). A case that has been explicitly labeled as belonging to a category is considered to be an explicit positive case for that category. On the other hand, a case that has been explicitly labeled as not belonging to a category is considered to be an explicit negative case for that category. In response to cases being explicitly labeled as belonging or not belonging to particular categories, the data set 124 is updated and one or more of the bound sets 112 are also updated by a case labeling module 128. Changes to the one or more bound sets 112 are ultimately propagated to the positives or negatives set 102 or 104 (assuming a change in fact did occur).

User selection in a user interface 132 of whether a case belongs or does not belong to a particular category is considered manual labeling of cases. However, it is also possible that cases can be labeled using other techniques, such as based on filtering performed by a rule-based labeling logic 134. The rule-based labeling logic 134 is able to apply one or more rules with respect to cases in the data set 124 to determine whether each of the cases should be considered to be an explicit positive or an explicit negative for one or more categories in the hierarchy of categories 120. For example, the rule-based labeling logic 134 can study the content of a summary or report for a particular case to search for predefined information fields. Based on the content of these information fields, the rule-based labeling logic 134 can label a case as belonging or not belonging to a category. For example, there may be information fields in a summary or report that indicate a particular type of problem that the summary or report represents. This information field may have been entered by a customer support representative or other call agent. In response to labeling applied by the rule-based labeling logic 134, the case labeling module 128 updates the data set 124 as well as one or more bound sets 112.

Manual labeling can be based on any number of techniques. Manual labeling can be as simple as presenting a user with a list of cases and asking the user to indicate to which categories these cases belong. Alternatively, a search-and-confirm technique can be used to assign cases to particular categories. The search-and-confirm technique involves submitting a query against the data set 124 to list cases that match one or more search terms of the query. For example, the query can be performed with a hypothesis in the form of "cases that match this query should be training examples for category C." In response to the query, information is displayed regarding cases that match the search term in the query. The user interface 132 can then be used to indicate whether each of the cases belongs or does not belong to a particular category, which is part of the confirm process. The search-and-confirm is repeated multiple times for multiple categories. A further discussion of the search-and-confirm technique is provided in U.S. Ser. No. 11/118,178, entitled "Providing Training Information for Training a Categorizer," filed Apr. 29, 2005.

The positives and negatives sets 102, 104 are used as training sets by a training module 114 to train one or more categorizers (also referred to as "classifiers") 116. Training a categorizer refers to building or modifying the categorizer based on the positives and negatives sets. Building a categorizer refers to initially training the categorizer, while modifying a categorizer refers to retraining a previously trained categorizer. Thus, "training" a categorizer refers to either initially training the categorizer or retraining a previously trained categorizer. The trained categorizer(s) 116 can then be used to categorize additional cases in the data set 124 (by assigning the additional cases to categories in the hierarchy 120).

The hierarchy of categories 120 can be modified (by moving, adding, or deleting categories) in response to input by a user. In one implementation, the hierarchy 120 is a directed acyclic graph (DAG). In other words, any category in the hierarchy 120 can have not only several children, but also several parents. Other structures of the hierarchy 120 can be used in other embodiments.

A category editor 126 (optional) may also be provided in the computer 100 to edit the hierarchy of categories 120 in response to user input at the user interface 132. For example, the user may decide to add categories, delete categories, or modify categories. In response to user input to add, delete, or modify categories, the category editor 126 is able to modify the hierarchy of categories 120.

The storage 106 is coupled to one or more central processing units (CPUs) 108, on which various software modules in the computer 100 are executable. For example, the case labeling module 128, rule-based labeling logic 134, inferencing logic 122, category editor 126, training module 114, and categorizer(s) 116 are executable on the CPUs 108.

Figure 2:
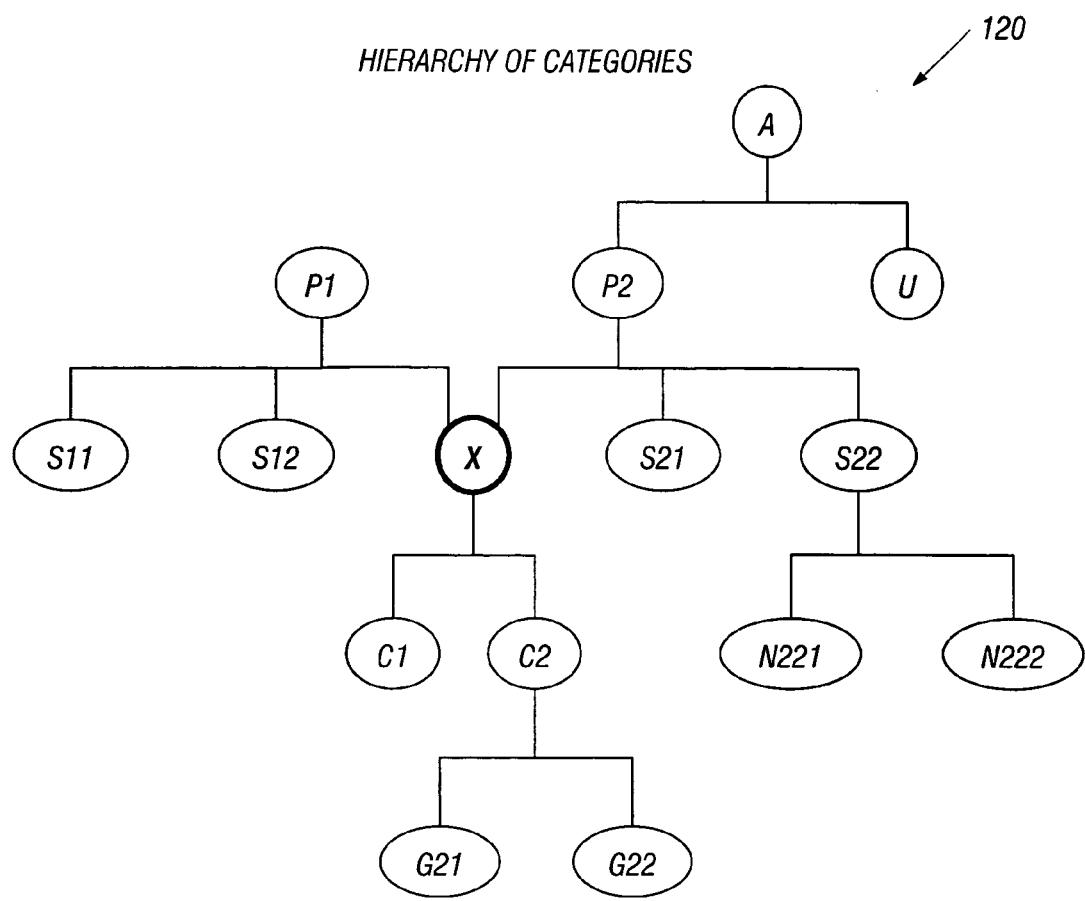
FIG. 2 illustrates an example hierarchy of categories for which sets of training cases are developed, in accordance with some embodiments.

An example hierarchy of categories 120 is depicted in FIG. 2. From the perspective of category X, there are various parents, children, and siblings. In the example depicted in FIG. 2, the siblings of category X include categories S11, S12, S21, and S22. The children of category X include categories C1 and C2. The grandchildren of category X (which are the children of category C2) are categories G21 and G22. The nephews of category X (which are the children of category S22) are categories N221 and N222. The parents of category X include categories P1 and P2. The grandparent of category X is category A. An uncle of category X (which is a child of category A) is category U.

In accordance with some embodiments of the invention, development of positives sets 102 and negatives sets 104 for categories of the hierarchy 120 takes advantage of the hierarchical structure of the categories, such as the hierarchical structure depicted in the example of FIG. 2. Development of the positives sets 102 and negatives sets 104 is based on inferencing, in which cases labeled for one category can be inferred as belonging to another category based on the hierarchical relationship defined by the hierarchy 120. For example, if a case is labeled as belonging to category C1 (a child of category X), then it can be inferred that such a case also belongs to category X (the parent of C1). This is referred to as upward inheritance of positives, which is a first inferencing rule which provides that unless explicitly stated otherwise, any case that is a positive for a child category will be inferred to be positive for the parent category.

Another inferencing rule is downward inheritance of negatives, which provides that unless there is an indication that a case should be considered positive for a category, that case should be negative if one of the category's parents considers it negative. The upward inheritance of positives and downward inheritance of negatives rules provide inferencing up and down the hierarchy.

A further inferencing rule is lateral inheritance of positives as negatives, which assumes that each case is likely only a member of one category (at least locally) at a particular level of the hierarchy 120. In other words, if a given case is a member of category C1, it is probably not a member of category C2 (note that C1 and C2 are at the same hierarchical level in the hierarchy 120). Additional rules for inferencing are described below.

Thus, in accordance with some embodiments, inferencing involves the inheritance of positive or negative cases in a first category as positive or negative cases in a second category based on the relationship of the first and second categories in the hierarchy. For the upward and downward inheritance rules, positives or negatives, respectively, of the first category are inherited as respective positives or negatives in the second category. For the lateral inheritance rule, positives of the first category are inherited as negatives of the second category.

Upon receiving an indication that a particular case is a positive or negative for a first category in the hierarchy 120, the particular case is identified as a positive or negative case for a second category in the hierarchy based on a relationship of the first and second categories. This identifying of the particular case as being a positive or negative case for the second category causes a training set for the second category to be modified. The modified training set can then be used to retrain a categorizer. In some embodiments, retraining a categorizer is equivalent to training a categorizer from scratch using the modified training set while in other embodiments, retraining the categorizer comprises modifying a previously-trained categorizer by making use of information associated with those cases which have been added to or removed from the training set or whose identification as positive or negative has inverted. The latter embodiments will often be more efficient for small changes when the underlying categorization method lends itself to such incremental retraining.

In addition to receiving indications that a particular case is a positive case or negative case for a given category, indications can also be received that a particular case is not a positive case or is not a negative case for a particular category. For example, a case previously identified as being a positive case for a category can later be determined, due to some event, as not being a positive case for the category.

Receiving an indication causes a change to be made to a bound set associated with the corresponding category. This change to the bound set causes creation of a change event (described further below). The change event contains information indicating the change that has occurred. The information contained in the change event can be used to efficiently retrain a categorizer from a previously trained state.

To enable the inferencing performed by some embodiments for developing training sets, each category is associated with a number of sets (bound sets 112, positives set 102, negatives set 104). As mentioned above, notification of changes to sets can be provided to listeners such that these changes can be propagated to other bound sets (and ultimately to the positives and negatives sets 102, 104). Propagation of changes from one set to another set allows propagation of changes throughout the hierarchy 120. Thus, for example, a change made to a set associated with category X can be propagated to sets associated with children categories C1, C2, and grandchildren categories G21, G22 (for inferencing down the hierarchy). Similar propagation of changes can be performed in sets up the hierarchy or laterally in the hierarchy, as discussed further below. Most of the sets (112, 102, 104) are algebraic sets, which are sets defined on other sets using set algebra. Algebraic sets and procedures for notifying listeners of changes to a set are described in further detail below in connection with FIGS. 13A-21.

Two of the sets associated with each category are an explicitPositives set and an explicitNegatives set. The explicitPositives and explicitNegatives sets are part of the bound sets 112 in FIG. 1. In some embodiments, these sets are extensional sets, which means that they explicitly contain their contents. These sets contain those cases explicitly confirmed or disconfirmed by the user (or imported from a saved training set) as belonging to the category. When a case is confirmed as belonging to the category, the case labeling module 128 (FIG. 1) adds the case to the category's explicitPositives set and removes the case from the category's explicitNegatives set. (If the case was not in the explicitNegatives set, this has no effect.) Similarly, when a case is disconfirmed, the case is added to the explicitNegatives set and removed from the explicitPositives set. When a case is marked as being "unknown" with respect to the category, the case is removed from both sets. Since explicitPositives and explicitNegatives are bound sets, any changes to their membership will be propagated in change events (described further below).

Two other sets associated with each category are a positives set and a negatives set (102 and 104 in FIG. 1). These are the actual training sets which will be used to train the categorizer(s) 116 associated with the category. The inferencing logic 122 determines how changes to the first two sets (explicitPositives and explicitNegatives) result in changes to the positives and negatives sets associated with various categories.

The following discussion refers to an example hierarchy of categories provided below. (Note that the example below would have a hierarchical structure similar to the FIG. 2 hierarchy.)

hardware
      screen
        cracked
        bad color
      keyboard
        jammed
        keys fell off
      battery
    software
      e-mail
      database
      browser In this example hierarchy, categories should be read as being children of the first category above them whose degree of indication is less (if such a category exists). Thus "hardware" and "software" are "top-level categories" (i.e., they have no parents or, in some embodiments their sole parent is an unmentioned "global root" category). The children of the "hardware" categories are the "screen", "keyboard", and "battery" categories, and the children of the "screen" category are the "cracked" and "bad color" categories.

In the context of this example, any case identified as belonging to the "cracked" category can be inferred to belong to the "screen" category (a parent of "cracked"), and, by transitivity, in the "hardware" category (a parent of "screen")

(based on the upward inheritance of positives rule). To implement this, the following logic is provided by the inferencing logic 122:

$$ChildrensPositives = \bigcup_{c \in children} c.positives;\qquad(Eq.\ 1)$$

$$notOverriddenChildrensPositives = childrensPositives - explicitNegatives;\qquad(Eq.\ 2)$$

$$positives = explicitPositives \cup notOverriddenChildrensPositives.\ (Eq.\ 3)$$

Figure 3:
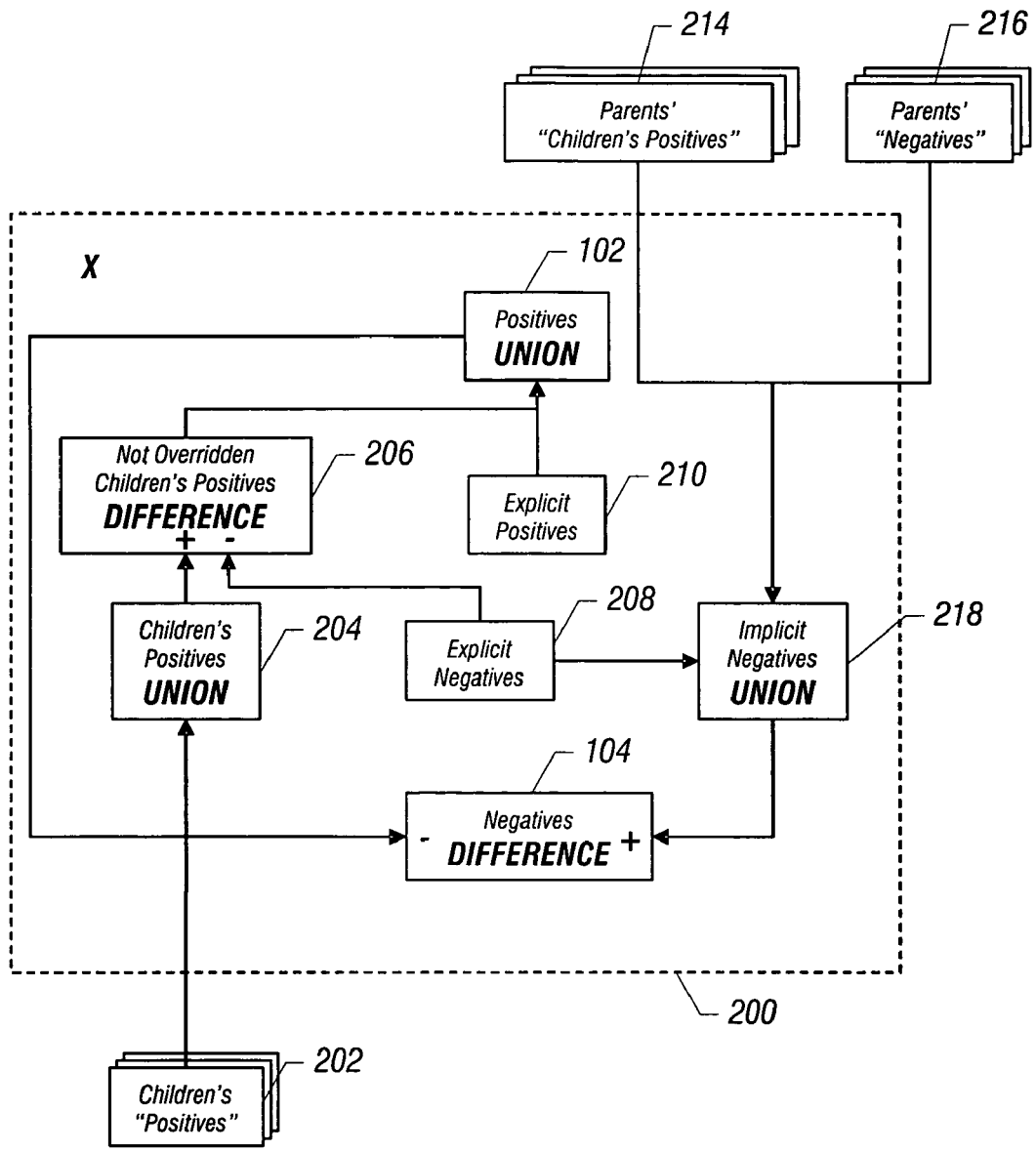
FIGS. 3-7 illustrate inter-relationships among bound sets defined for various categories, in accordance with an embodiment.

The childrensPositives set referred to in Eq. 1 above is another one of the bound sets 112 associated with a category, such as category X (200) shown in FIG. 3. The childrensPositives set (204 in FIG. 3) is an object (an algebraic set) that represents the union of the positives sets (202) of each of the category's children (c.positives). In the Eq. 1, c is a member of the children set associated with the category. The children set is also a bound set (of categories). The category itself (e.g., X in FIG. 3) registers a listener with the children set, and whenever the contents of the children set changes (that is, whenever the category gains or loses a child category), the positives set (202) of the added or removed child category is added or removed as a subset of the category's childrensPositives set (204). For example, if a new child category of category X is added, then a listener associated with category X is notified of this change, and the positives set (202) of this new child category is added as a subset of the childrensPositives set 204 of category X. On the other hand, if a child category is removed as a child of category X, then the positives set for the removed child category is removed as a subset of the childrensPositives set 204.

The notOverriddenChildrensPositives set (206 in FIG. 3), referred to in Eq. 2 above, contains those cases inherited as positive cases from the category's children (childrensPositives 204) that are not explicitly labeled as negative for the category (i.e., are not contained in the category's explicitNegatives set 208). In other words, the positives for a category's children are considered positives of the category unless explicitly labeled as negatives. For example, this handles the case where, for some reason, a case was explicitly labeled simultaneously positive for "bad color" and negative for "hardware" (the "hardware" category is a grandparent of the "bad color" category). The inference would consider the case to be positive for the "screen" category and therefore part of the childrensPositives set for the "hardware" category. However, the fact that the case is in the explicitNegatives set for the "hardware" would mean that the case would not be considered to be part of "hardware" category's notOverriddenChildrensPositives set (206). The notOverriddenChildrensPositives set (206) is implemented as a set difference object, which implements logic that makes the object act as though the object contains all members of one set (childrensPositives set 204) that are not also members of a second set (explicitNegatives set 208). The +input is considered the "base," while the −input is considered the "filter." The set difference object represents the difference between the base and filter; the set difference object contains all members of the base (+) that are not also members of the filter (−).

The positives set (102 in FIG. 3), defined by Eq. 3 above, contains all cases in the notOverriddenChildrensPositives set as well as all cases explicitly labeled as being in the category (explicitPositives set 210). Note that the positives set 102 is itself a union (in some embodiments implemented as a more efficient binary union) of two other sets. The reason that the explicitPositives set 210 is not added as one of the subsets to the union (204) that contains the positives for the children is that if a case was somehow in both the explicitPositives and explicitNegatives sets for a given category, the case would be added in and then filtered out, resulting in the negative taking precedence. In some embodiments, a positive labeling takes precedence over a negative labeling, and so the inferencing logic 122 first subtracts out the explicit negatives (208) and then adds in the explicit positives (210) to develop the positives set 102. In other embodiments a negative labeling takes precedence over a positive labeling, and such an embodiment might have one object representing a union of the children's positives sets 202 and the category's explicit positives set 210, while the category's positives set 102 is implemented as an object representing the set difference between this object and the category's explicit negatives set 208.

As noted, the positives set 102 is implemented as a "binary union" object, which is somewhat more efficient (though less flexible) than a general union object used to implement childrensPositives. Binary union and general union objects are discussed further below. In some embodiments other objects are used which implement the specified set logic semantics.

An embodiment also implements the downward inheritance of negatives rule, which provides that unless there is an indication that a case should be considered positive for a category, the case should be negative if one of the category's parents considers the case negative. The basic rule (which will be modified based on the lateral inheritance of positives as negatives rule) is as follows:

$$implicitNegatives = explicitNegatives \cup \bigcup_{p \in parents} p.negatives;\qquad(Eq.\ 4)$$

$$negatives = implicitNegatives - positives.\qquad(Eq.\ 5)$$

As with the upward inheritance rule, the category (e.g., X in FIG. 3) registers a listener for changes in its (bound) parents set of categories (note that the parents set is the equivalent of the children set except that the parents set contains the set of a category's parent categories, while the children set contains the set of the category's children categories). Whenever the parents set changes (such as addition or removal of a parent category of category X), the affected negatives set (p.negatives above and 216 in FIG. 3) associated with the added or removed parent category is added or deleted, respectively, as subsets of the category's implicitNegatives set (218 in FIG. 3). Unlike with the positive cases, the explicit negatives (208 in FIG. 3) of a category are simply added as a subset of implicitNegatives (218), as defined by Eq. 4 above. The negatives set (104) is a set difference object that removes any (explicit or inherited) positives (102) from the set of negatives, as defined by Eq. 5 above. (Recall that explicit negatives were already removed from the set of inherited positives.)

So far, the logic above implements inheritance up and down the hierarchy, which is useful. However, what allows negative sets to be built up even more quickly is the lateral inheritance of positives as negatives rule. For example, if a given case is asserted to be in the "bad color" category in the example given above, the case is probably not also in the "screen cracked" category (note that the "bad color" category and "screen color" category are at the same hierarchical level). Although the case may in fact be part of the "screen cracked" category, it is reasonable to assume that the case is not unless it is asserted otherwise.

Since the case is in the "bad color" category, the case is inferred to be in the "screen" category (by upwards inheritance), and so the logic infers (by lateral inheritance) that the case also is not in the "keyboard" category. By downwards inheritance, it is also inferred that the case is not in the "jammed" category (a child of "keyboard"). However, if the case is explicitly asserted or inferred to be in the "keyboard" category (from some other source), the logic blocks the lateral inheritance of negatives and prevents the case from being inferred as not being in the "jammed" category.

To implement the lateral inheritance rule, the inferencing logic 122 indicates that anything that is one of a category's siblings' positive cases is negative for the category. The most straightforward way to do this is to simply change the definition of implicitNegatives to $$implicitNegatives = explicitNegatives \cup \bigcup_{p \in parents} p.negatives \cup \bigcup_{p \in parents} p.childrensPositives. \quad \text{(Eq. 6)}$$

Thus, according to Eq. 6 above, the implicitNegatives set 218 is a general union of the explicitNegatives set (208), the union of all the parents' negatives sets (216), and the union of all the parents' childrensPositives sets (214). (Recall that childrensPositives is simply the union of all children's positives sets (202).) Thus, what $$\bigcup_{p \in parents} p.childrensPositives$$

represents is that the positives of the children of a category's parents' are part of the implicitNegatives set of the category. In other words, according to Eqs. 5 and 6, the positives of the children of a parent of a category are considered negatives of the category unless otherwise indicated as positives (in the positives set 102 of the category).

Note that since each of a category's parents' childrensPositives set (214) will contain that category's positives, this implies that the category's implicitNegatives set (218) will also contain its positives. This does not pose a problem, since the category's negatives set (104) is defined as a set difference that removes the positives (102). Note that this new definition implies that two sets are added or deleted whenever a parent is added or deleted.

There are situations in which blocking of certain of the inheritance rules described above is desirable. Consider an example that provides a "problem" category (with the example hierarchy discussed above under the "problem" category), a "product" category (with an associated hierarchy under the "product" category), and a "geography" category (with an associated hierarchy under the "geography" category). While learning that a case belongs to the "e-mail" category allows the inference that the case is also in the "software" category and probably not in the "battery" category, there is really no reason to believe that the case should not be in a "Japan" category (which is a child of the "geography" category) (note that such an inference would have resulted from the lateral inheritance rule). Vice versa, learning that a case belongs in the "Japan" category does not imply that the case is not in the "hardware" category. In one embodiment, to prevent such inferences, an explicit rule is added that states:

$$globalRoot.childrensPositives = \emptyset. \quad \text{(Eq. 7)}$$

Figure 8:
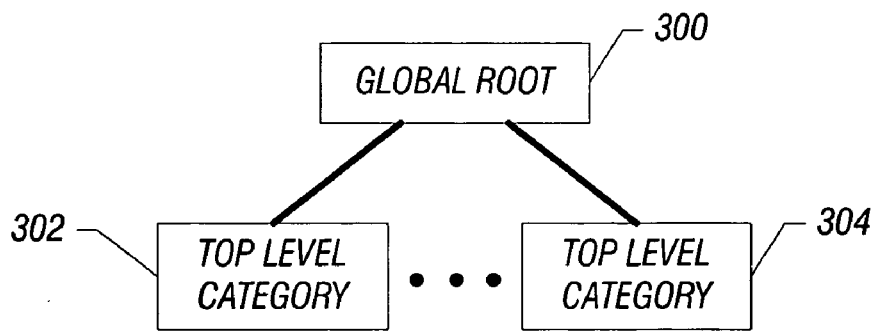
FIG. 8 illustrates a global root node and top-level categories of the hierarchy of categories for which training sets are to be developed, according to some embodiments.

As depicted in FIG. 8, in some embodiments there is an often invisible system-defined "globalRoot" category 300 which has no parent and which is, by definition, a parent of any category 302, 204, considered to be "at top level" in a user's hierarchy of categories, such as the "problem" category, "geography" category, and "product" categories mentioned above. Eq. 7 specifies that the childrensPositives set of the globalRoot category is defined to be empty, which prevents the propagation of children's positives of one top-level category as negatives in another top-level category. Effectively, the lateral inferencing rule is disabled for all top-level categories under the globalRoot category. With the rule defined in Eq. 7 in place, lateral inheritance of positives as negatives is allowed everywhere in the hierarchy 120 except at the top level, which provides the desired behavior. In other words, positives of the "geography" category (or children of the "geography" category) will not be inferred as negatives of the "product" category, as would have occurred according to the lateral inheritance rule without the Eq. 7 rule in place.

However, in some scenarios, lateral inheritance for certain top-level categories is desirable. For example, the top-level categories may include the "hardware" category, "software" category, "product" category, and "geography" category. In this example scenario, lateral inheritance is desirable between the "software" and "hardware" top-level categories, but not with the "product" and "geography" categories. To address this, according to another embodiment, each category is further annotated with a Boolean inferNegativesAtTopLevel flag (or other type of indicator). When this flag is set (true), the inferencing logic 122 ensures that whenever (and only whenever) the category is at top level, the category's positives set is added as a subset of globalRoot's childrensPositives; and globalRoot's childrensPositives set is added as a subset of the category's implicitNegatives. When the flag is clear (false), this does not happen. The inferencing logic 122 monitors changes to each category's inferNegativesAtTopLevel flag and takes the appropriate action. In the above example, the inferNegativesAtTopLevel flag would be true for the "hardware" and "software" categories, but false for the "product" and "geography" categories. As a result, lateral inferencing is disabled for the "product" and "geography" categories, but remains enabled between the "hardware" and "software" categories.

Figure 4:
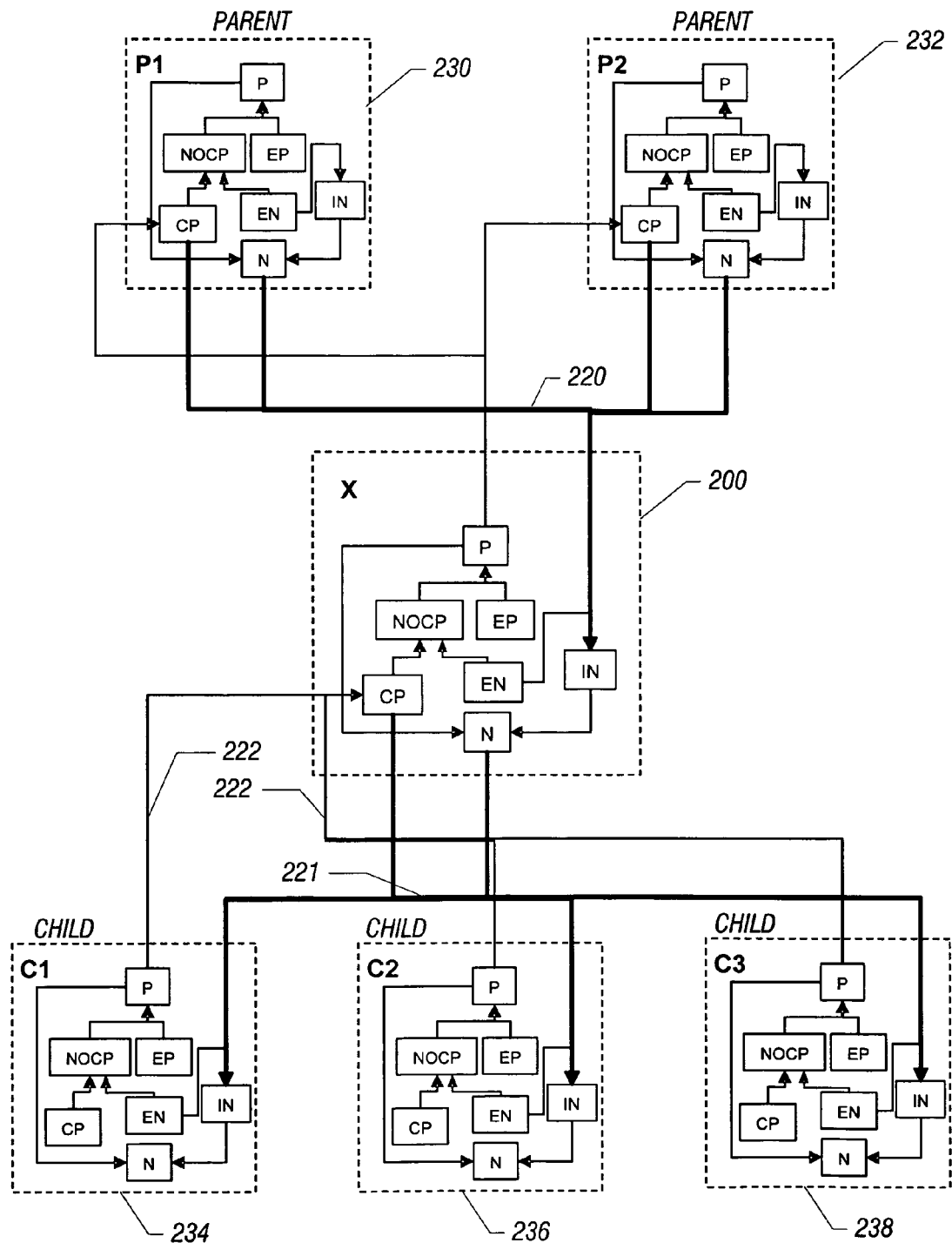

FIG. 4 is based on the arrangement of FIG. 3, except that parent and children categories (and their associated bound sets) are also depicted in addition to category X (and its bound sets). The parent categories P1 and P2 (230 and 232) include the same combination of bound sets as category X (described in connection with FIG. 3). As depicted in FIG. 4, the negatives sets (N) and childrensPositives sets (CP) of the parent categories P1 and P2 are input (at 220) to the implicitNegatives set (IN) of category X. The CP sets of parent categories P1 and P2 depicted in FIG. 4 correspond to the sets 214 of FIG. 3; and the N sets of parent categories P1 and P2 correspond to the sets 216 of FIG. 3.

Similarly, the childrensPositives set (CP) and negatives set (N) of category X are provided as inputs (at 221) to the implicitNegatives sets (IN) of category X's children categories C1, C2, and C3 (234, 236, and 238, respectively). Also depicted in FIG. 4 is the fact that the positive sets (P) of the children categories C1, C2, and C3 (which correspond to sets 202 in FIG. 3) are provided as inputs (at 222) to the children's positive set (CP) of category X.

Figure 5:
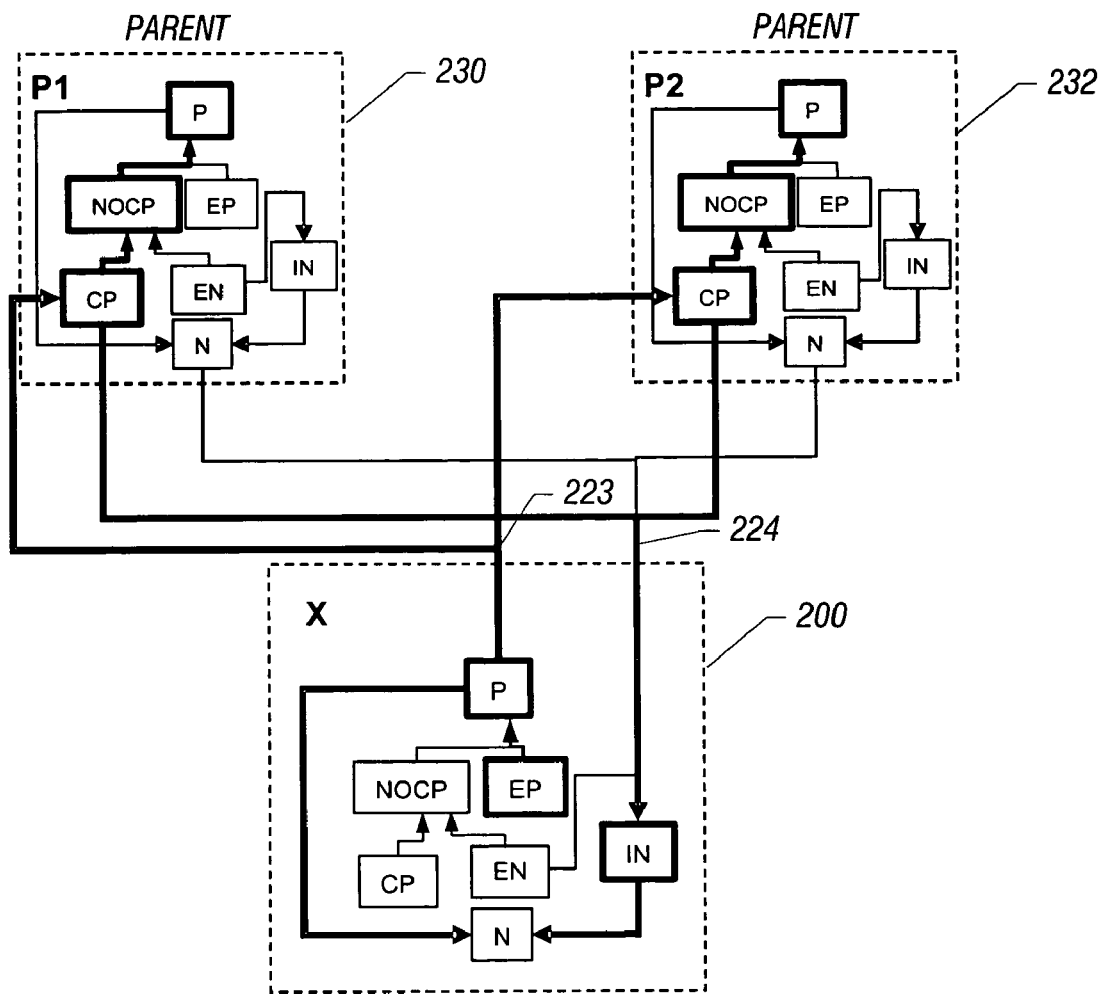

FIG. 5 illustrates what happens when a change is made to the explicitPositives set (EP) of category X (according to the upward inheritance of positives rule). For example, a new training case may have been added to the explicitPositives set. This change to the explicitPositives set is propagated to the positives set (P) in category X, which in turn is propagated (at 223) to the childrensPositives sets (CP) of parent categories P1 and P2. The change to the positives set (P) in category X should also be propagated to the negatives set (N) of category X. Also, changes to the childrensPositives sets (CP) of parent categories P1 and P2 are propagated (at 224) to the implicitNegatives set (IN) of category X, which in turn should be propagated to the negative set (N) of category X. However, no change actually occurs in the negative set (N) because the addition of a case to the positives set (P) is reflected also in the negatives set (N) of category X. Remember that the negatives set is a difference object between the implicitNegatives set and the positives set. Thus, addition of a case to both the positives set and the implicitNegatives set means that no change actually occurs in the negatives set.

Continuing further with the example of FIG. 5, each change to the childrensPositives set (CP) in each of parent categories P1 and P2 is propagated to the notOverriddenChildren'sPositives set (NOCP) in each of parent categories P1 and P2. The change to the notOverriddenChildrensPositives set is propagated to the positives set (P) of each of parent categories P1 and P2.

Effectively, as shown in FIG. 5, if a new case is indicated as being positive for category X (resulting in a change to the explicitPositives set of category X), the change is propagated to the positives set of category X, as well as to the positives sets of parent categories P1 and P2. Note that the changes to the positives sets of parent categories P1 and P2 will continue up the hierarchy to other higher level categories according to the upward inheritance of positives rule.

Figure 6:
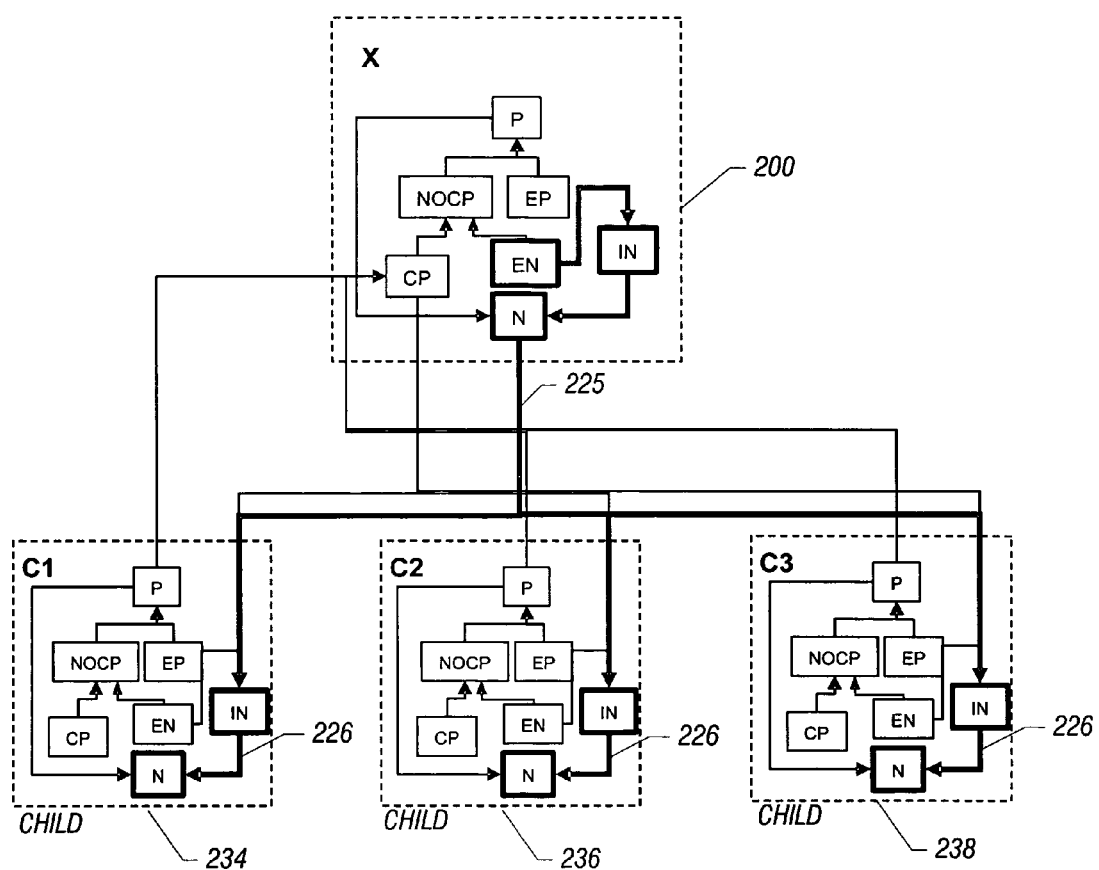

FIG. 6 depicts an example application of a downward inheritance of negatives rule in which a change is made to the explicitNegatives set (EN) in category X. For example, a case may have been added to the explicitNegatives set of category X. In response to this change, the implicitNegatives set (IN) of category X is modified, which is then propagated to the negatives set (N) of category X.

The change to the negatives set (N) of category X is propagated (at 225) to the implicitNegatives set (IN) of the children categories C1, C2, and C3. In each of the children categories C1, C2, and C3, the change to the implicitNegatives set is propagated (at 226) to the negatives set (N). This propagation to the negatives set of a child category would be blocked if the added case were in the category's positives set (P).

Effectively, as shown in FIG. 6, if a new case is indicated as being negative for category X (resulting in a change to the explicitNegatives set of category X), the change is propagated to the negatives set of category X, as well as to the negatives sets of children categories C1, C2, and C3. The change is propagated further down the hierarchy according to the downward propagation of negatives rule.

Figure 7:
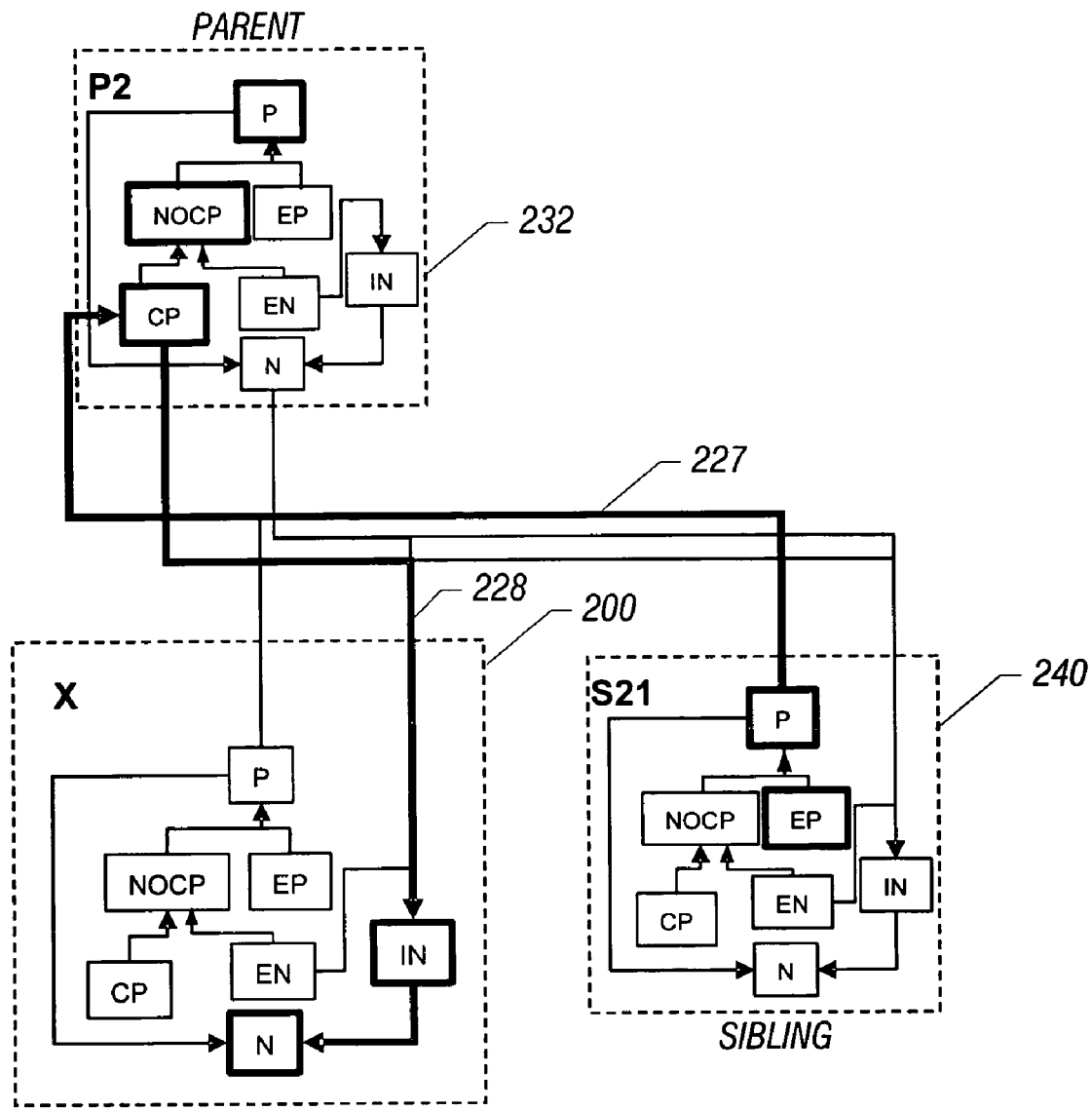

FIG. 7 shows an example application of the lateral inheritance of positives as negatives rule. A change in the explicitPositives set (EP) in category S21 (labeled 240 and which is a sibling of category X), is propagated to the positives set (P) of category S21. The change to the positives set of category S21 is in turn propagated (at 227) to the childrensPositives set (CP) in the parent category P2. The change to the childrensPositives set in the parent category P2 is propagated (at 228) to the implicitNegatives set (IN) of category X, which in turn is propagated to the negatives set of category X. Thus, as illustrated in FIG. 7, a case added as a positive to the explicitPositives set of a sibling (S21) is inferred as a negative in category X. (This inference would be blocked if the case were also a member of category X's positives set.)

Continuing with the example of FIG. 7, the change in the childrensPositives set of parent category P2 is propagated to the notOverriddenChildrensPositives set (NOCP) of parent category P2. The change to the notOverriddenChildrensPositives set is in turn propagated to the positives set (P) of parent category P2. In other words, what has occurred is that a positive case added to category S21 (a child of parent category P2) is reflected as a positive set also in parent P2 (and as a negative in sibling category X).

Figure 9:
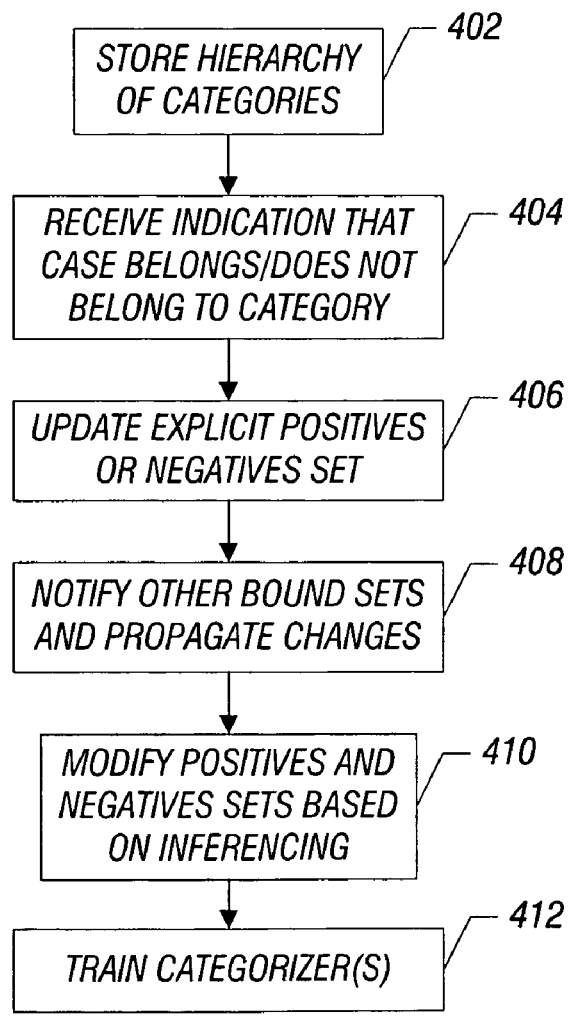
FIG. 9 is a flow diagram of a process of developing training cases, according to an embodiment.

FIG. 9 shows a flow diagram of a process performed according to an embodiment. A hierarchy of categories is stored (at 402), such as in the storage 106 of computer 100 in FIG. 1. An indication is received (at 404) that a case belongs (a positive case) or does not belong (a negative case) to a particular category. For example, this indication can be received through the user interface 132 (based on some selection by a user) or from the rule-based labeling logic 134 based on one or more rules. The indication is received by the case labeling module 128, which updates (at 406) the explicitPositives or explicitNegatives set of the category based on the indication received. In other words, if the case is indicated as a positive case for the category, then the case is added to the explicitPositives set. However, if the case is indicated as a negative case for the category, then the case is added to the explicitNegatives set. Note that the received indication can indicate that a case previously identified as a positive for a particular category is no longer a positive (which would cause the case to be removed from the explicitPositives set), or the received indication can indicate that a case previously identified as a negative for a particular category is no longer a negative (which would cause the case to be removed from the explicitNegatives set).

The change to the explicitPositives set or explicitNegatives set is detected by the inferencing logic 122, which notifies (at 408) the other bound sets and propagates the changes, such as in the manner depicted in FIGS. 3-7. Ultimately, the inferencing logic 122 modifies (at 410) the positives and negatives sets of various categories based on the inferencing rules discussed above.

Upon modification of the positives and/or negatives sets of various categories, the training module 114 (FIG. 1) further trains one or more categorizers 116 based on the changed positives and negatives sets in the various categories. The procedure of FIG. 9 can be repeated as additional changes are detected. In some implementations, it may be desirable to delay starting the training module 114 until there have been no more changes to the training sets for a predetermined time interval (e.g., several seconds).

Optionally, to maintain the ability to easily undo deletion operations of categories (which would otherwise lose training assignments), rather than actually deleting categories from the hierarchy, the deleted categories are marked as being invisible. Such invisibility has the following properties: (1) the positive training cases for an invisible category (or its descendents) is considered to be equivalent to explicit positive cases. In other words, the training cases "bubble up" to the lowest visible level (or, if there are multiple parents, levels); (2) lateral inheritance should not infer negatives from an invisible sibling's positives; and (3) when the explicit positive cases are displayed, the positive cases from invisible children should also be displayed.

Displaying positive cases refers to displaying, in some user interface (such as user interface 132 in FIG. 1) some listing of or aggregation of some attribute of the positive cases. For example, a count of the number of positive cases for a particular category can be maintained in the user interface.

Figure 10:
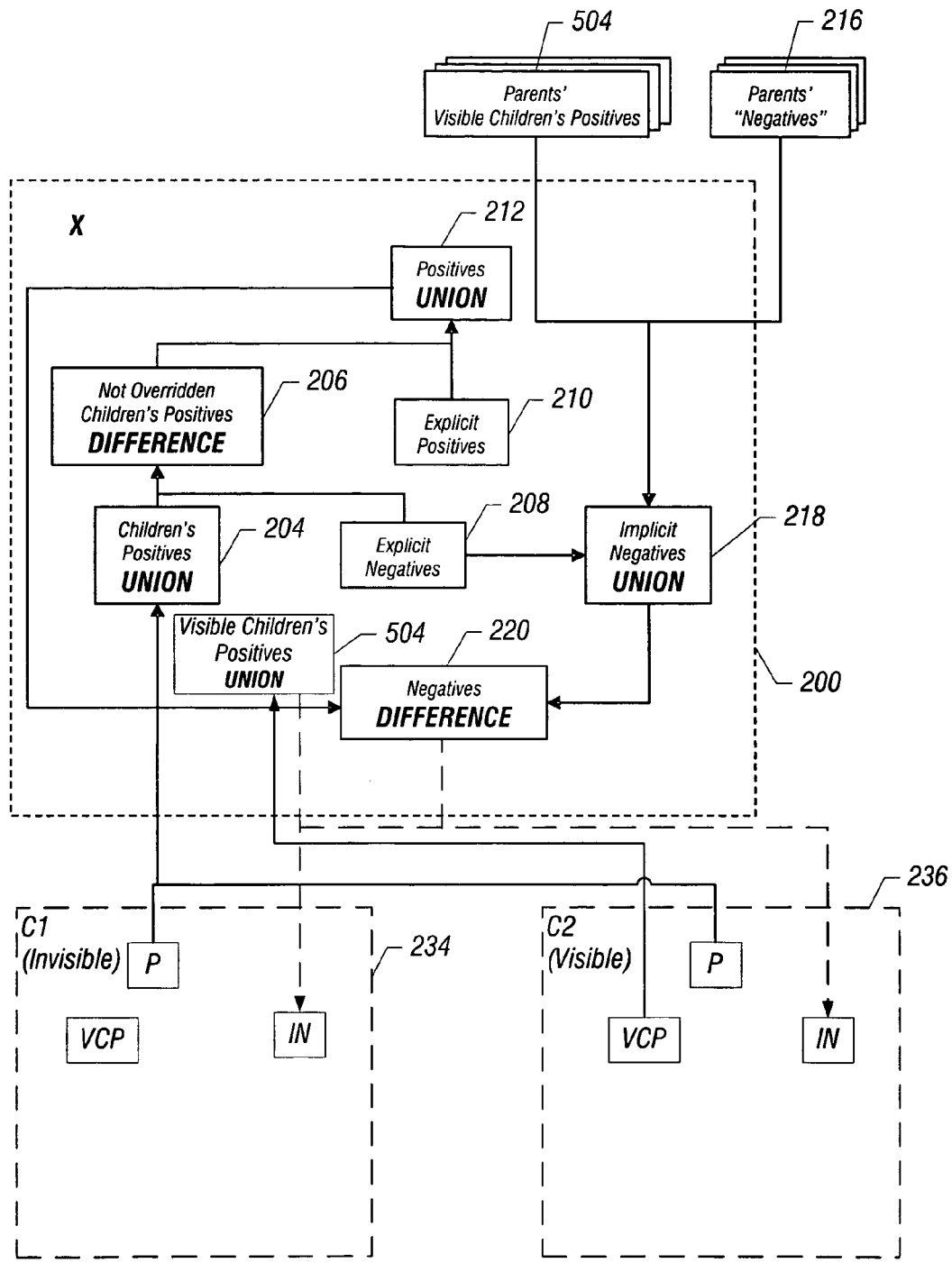
FIG. 10 illustrates inter-relationships among bound sets defined for various categories, in accordance with another embodiment.

Property (1) above is already provided for by the inferencing logic 122 because the invisible children categories are still in the children set, and so their positives are still in the category's childrensPositives and therefore in the category's positives. For example, as shown in FIG. 10, the positives of invisible child category C1 is part of the childrensPositives set of category X. Note that the positives of visible child category C2 is also part of the childrensPositives set of category X.

To handle property (2) above, the inferencing logic 122 is modified to redefine the implicitNegatives set as follows:

$$visibleChildrensPositives = \bigcup_{vc \in visible\ children} vc.positives. \quad (Eq.\ 8)$$

$$implicitNegatives = explicitNegatives \cup \bigcup_{p \in parents} p.negatives \cup \bigcup_{p \in parents} p.visibleChildrensPositives \quad (Eq.\ 9)$$

The visibleChildrensPositives set (504 in FIG. 10) is a separate set that is the union of the positives (vc.positives) only of visible children categories (e.g., C2 in FIG. 10). Thus, in FIG. 10, the visibleChildrensPositives set 504 receives at its input the positives set of visible child category C2 but not the positives set of invisible child category C1. Handlers that are part of the inferencing logic 122 monitor changes in a category's visibility and take positives out of the category's parents' visibleChildrensPositives set or put the positives in as appropriate. In other words, if a handler detects that the child category C2 has become invisible (in other words, C2 was deleted), then the positives of child category C2 are taken out of the visibleChildrensPositives set 504. On the other hand, if a handler detects that the child category C1 has become visible (such as in response to an undo of the delete operation of child category C1), then the positives of C1 are added into the visibleChildrensPositives set 504 of category X.

A further change is that the implicitNegatives set is modified to laterally inherit only from the parents' visibleChildrensPositives set, with the caveats about inferNegativesAtTopLevel flag discussed above. Thus, as depicted in FIG. 10, the implicitNegatives sets (IN) of children categories C1 and C2 receive input from the visibleChildrensPositives set 504 in category X (rather than the childrensPositives set 204). Similarly, the implicitNegatives set 218 of category X receives input from parents' visibleChildrensPositives sets 502, as shown in FIG. 10.

To handle property (3) above, the following are defined:

inheritedPositives=notOverriddenChildrensPositives–visibleChildrensPositives; (Eq. 10)

displayedPositives=explicitPositives∪inheritedPositives, (Eq. 11)

where inheritedPositives is the set of cases that are considered to belong to the category because they come from invisible children (the ones from all children minus the ones from visible children) and displayedPositives is the (binary) union of the explicit positives and the inherited ones. The displayedPositives set contains the positive cases that are displayed in a user interface.

Figure 11:
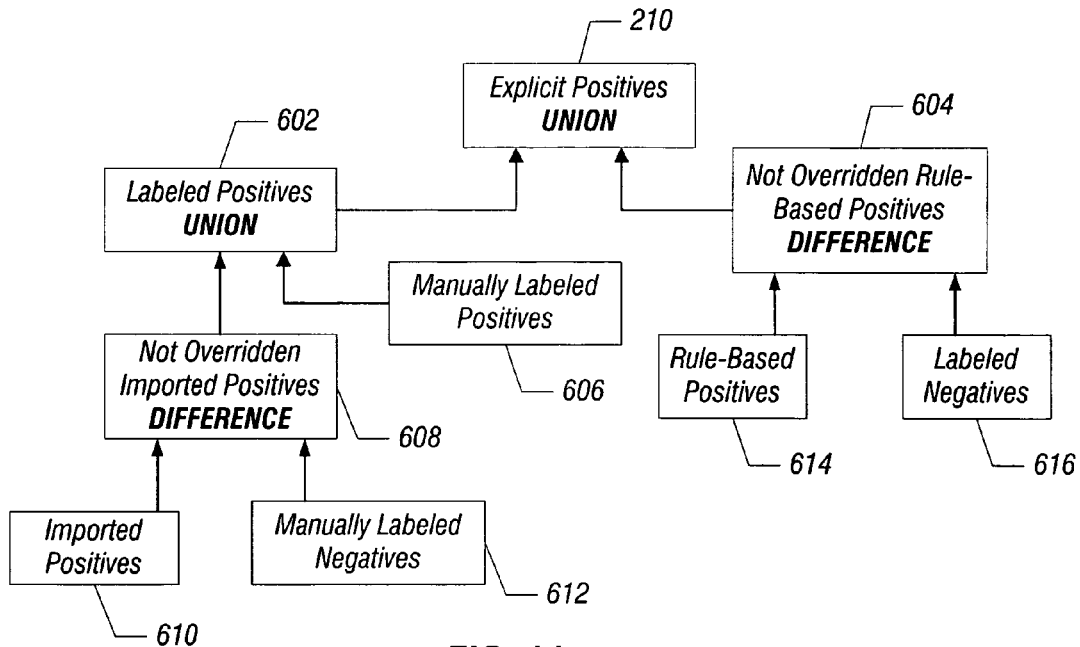
FIGS. 11 and 12 illustrate how an explicit positives set and an explicit negatives set, respectively, are built, in accordance with an embodiment.
Figure 12:
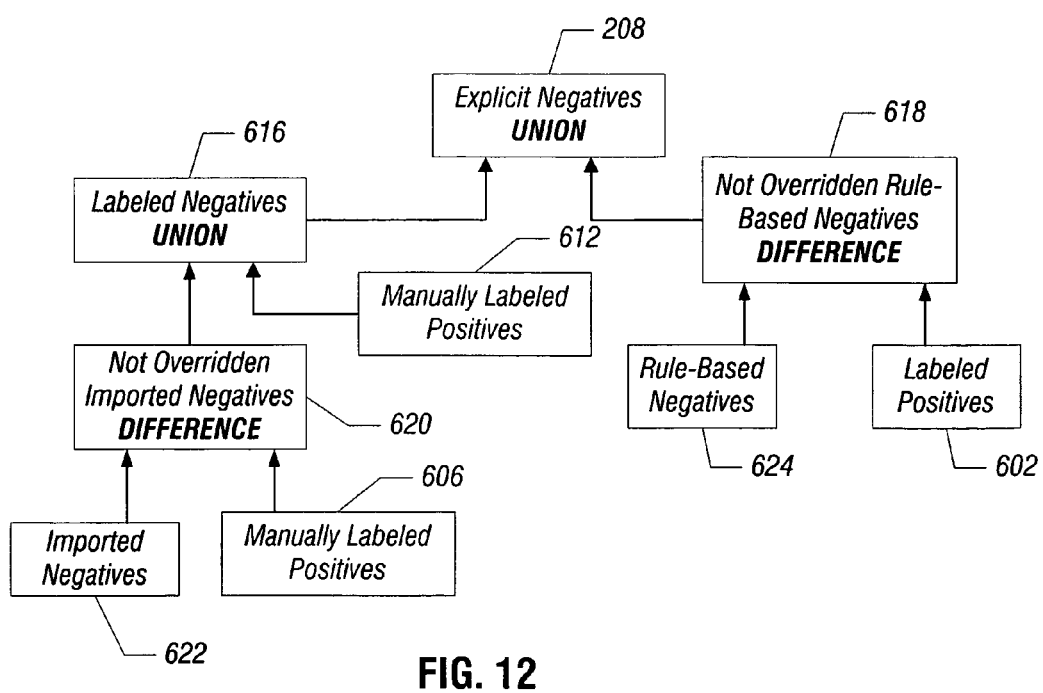

The explicitPositives sets 210 and explicitNegatives set 208 (FIGS. 11 and 12, respectively) can be defined as binary union objects, in accordance with some embodiments. Note that in one embodiment, the explicitPositives set 210 and explicitNegatives set 208 can be just normal bound sets that contain cases manually labeled as positive or negative, respectively. Alternatively, if rule-based labeling is implemented in accordance with some embodiments, then the logic of FIGS. 11 and 12 is used to define the explicitPositives set and explicitNegatives set. The explicitPositives set 210 is a binary union of a labeledPositives set 602 and a notOverriddenRuleBasedPositives set 604. The labeledPositives set 602 is a binary union of a manuallyLabeledPositives set 606 (which contains cases manually labeled by a user as being positive), and a notOverriddenImportedPositives set 608. The notOverriddenImportedPositives set 608 is a difference object having as inputs an importedPositives set 610 and a manually LabeledNegatives set 612. Imported positives refers to positives that have been imported from another session (such as a prior session) or from some other source. (In some embodiments what is actually imported is the labeling of the cases rather than the cases themselves.) A session is some connection period or login period during which a user (or software routine) has performed labeling (either explicitly or by inference) of training cases with categories in the hierarchy 120. Sets from prior sessions can be imported to subsequent sessions to build upon to further develop positives and negatives sets.

The labeledPositives set (602) includes content of the manuallyLabeledPositives set (606) as well as those cases contained in the importedPositives set (610) that have not been manually labeled as negatives (612) in the current session.

The notOverriddenRuleBasedPositives set 604 is a difference object having as inputs a ruleBasedPositives set 614 and a labeledNegatives set 616. The ruleBasedPositives set 614 contains training cases identified as being positives according to some predefined rule. The labeledNegatives set 616 is defined in FIG. 12.

Effectively the notOverriddenRuleBasedPositives set 604 contains all of the cases that have been identified as being positives based on one or more the predefined rule, minus the cases have been labeled as negatives.

The explicitNegatives set 208 is a binary union of the labeledNegatives set 616 and a notOverriddenRuleBasedNegatives set 618. The labeledNegatives set 612 is a binary union of a notOverriddenImportedNegatives set 620 and the manuallyLabeledNegatives set 612. The notOverriddenImportedNegatives set 620 is a difference object having as inputs an importedNegatives set 622 (negatives imported from a previous session) and the manuallyLabeledPositives set 606. Thus, the labeledNegatives set 612 includes all manually labeled negatives (612) as well as imported negatives (622) unless such imported negatives have been manually labeled as positives (606).

The notOverriddenRuleBasedNegatives set 618 is a difference object having as inputs a ruleBasedNegatives set 624 and the labeledPositives set 602. Thus, the notOverriddenRuleBasedNegatives set 618 contains all rule-based negatives (identified by one or more predefined rules) unless such cases have been labeled as positives (602).

In some embodiments, the logic of FIGS. 11 and 12 is modified to add, in addition to sets of manually labeled positives (606) and negatives (612), a set of manually-labeled unknowns. Such a set records the indication that a case, even if implied to be positive or negative due to its presence in the category's imported positives (610), imported negatives (622), rule-based positives (614), or rule-based (624), should not be considered to be either an explicit positive (210) or explicit negative (208) for that category. To accomplish this, the filter for the not-overridden imported positives set (608) is changed from the manually-labeled negative set (612) to a binary union of that set and the manually-labeled unknowns set. Also, the filter for the non-overridden rule-based positives set (604) is changed from the labeled negatives set (616) to a binary union of that set and the manually-labeled unknowns set. The logic implementing the non-overridden imported negatives set (620) and not-overridden rule-based negatives set (618) is changed analogously.

In some other embodiments, the logic of FIGS. 11 and 12 is modified to omit the distinction between imported positives (or negatives) and manually labeled positives (or negatives). In such embodiments, the labeled positives and negatives sets take their initial value from training sets imported at the beginning of the session and these labeled sets are modified as the session progresses and manual labels are explicitly added or removed. In such embodiments logic is provided to record sufficient information about manual labeling to allow for (1) correct behavior during dynamic addition and removal of imported training sets and (2) saving the work of the current session for use in subsequent sessions.

To enable the inferencing techniques discussed above, changes to one bound set are propagated to other bound sets in change events. As briefly noted above, each bound set is associated with one or more listeners that are called when a change is made to the bound set. The listeners are notified of change events to the bound set, with the listeners causing changes to be made to other bound sets to propagate a change made to one bound set to other bound sets, as discussed in connection with FIGS. 3-7 and 10-12, above. The discussion of bound sets and how changes to bound sets are propagated is discussed in connection with FIGS. 13A-21 below.

As depicted in FIG. 13A, the computer 1100A (which can be the same as computer 100 of FIG. 1) includes a bound set 1106 and a listener 1110 that is registered to receive change events representing changes made to the bound set 1106. Note that multiple listeners 1110 can be registered for the bound set 1106. Also, there can be a plurality of bound sets 1106 with associated groups of one or more listeners 1110. It is also possible that a bound set is not associated with any listeners.

In the state depicted in FIG. 13A, there are no pending events for the bound set 1106 (in other words, no changes have been made to the bound set since the last time the listener 1110 was updated). As shown in FIG. 13A, the bound set 1106 points (at 1120) to null (Ø), which means that no pending events exist for the bound set 1106. Also shown in FIG. 13A is a First Listener pointer 1122 that points to the registered listener (the first listener) that has been on the list the longest since the listener was added or last invoked. Another pointer 1124 from the bound set 1106 is a First Up-to-Date Listener pointer that points to the oldest listener for which the bound set 1106 has not changed since the oldest listener was added or last invoked.

Effectively, the First Listener pointer 1122 and First Up-to-Date Listener pointer 1126 are tracking pointers that enable a mechanism according to some embodiments to track which listeners are up to date and which listeners remain to be updated with one or more change events. Both the First Listener pointer 1114 and First Up-to-Date Listener pointer 1116 are initially set to a null value. If both the First Listener and First Up-to-Date Listener pointers point to the same listener, then that is an indication that all listeners are up to date. The First Listener and First Up-to-Date Listener pointers 1122 and 1124 point to one or more list elements 1108 that are associated with respective one or more listeners 1110. A list element 1108 is an element of a list of listeners, described further below.

The bound set 1106 includes an interface that is associated with various software methods that can be called to perform various tasks according to some embodiments (e.g., register a listener, un-register a listener, check if a listener is associated with a bound set, begin change, end change, etc.). A "software method" refers to a software routine or module that is invocable to perform a predefined task. In the ensuing discussion, "software methods" are simply referred to as "methods." Also associated with the bound set 1106 are various methods for querying the state and contents of the bound set 1106 as a set and, optionally, adding an object to a bound set, removing an object from a bound set, and clearing a bound set.

Software in the computer 1100A, including methods and objects associated with the bound set 1106, listeners 1110, and other software, are executable on one or more CPUs 1102, which is (are) coupled to storage 1104 for storing data (including data structures associated with the bound set 1106, various lists, collections, and other data structures). The CPUs 1102 and storage 1104 can be the CPUs 108 and storage 106, respectively, of FIG. 1.

FIG. 13B illustrates an alternative embodiment in which the bound set 1106 of FIG. 13A is separated into two components: a bound set 1112 and a change support object 1114. The bound set 1112 contains the interface of bound set 1106, while the change support object 1114 contains the methods (that are part of the implementation) of the bound set 1106. FIG. 13B also illustrates a "Support" pointer that the bound set 1112 uses to point to the associated change support object 1114; and a "Source" pointer that the change support object 1114 uses to point to the associated bound set 1112.

As will be discussed further below, the FIG. 13B embodiment is an embodiment tailored to certain programming environments, such as those written in the Java programming language, that make it difficult to have interface and implementation specified in the same component in a general manner. Note, however, in other embodiments (such as those developed in the C++ or other software language), segregation of the interface and implementation may not be used (resulting in the more efficient bound set 1106 of FIG. 1A). The remaining components of the computer 1100B of FIG. 13B are similar to corresponding components of computer 1100A (and therefore are assigned the same reference numerals).

Figure 14A:
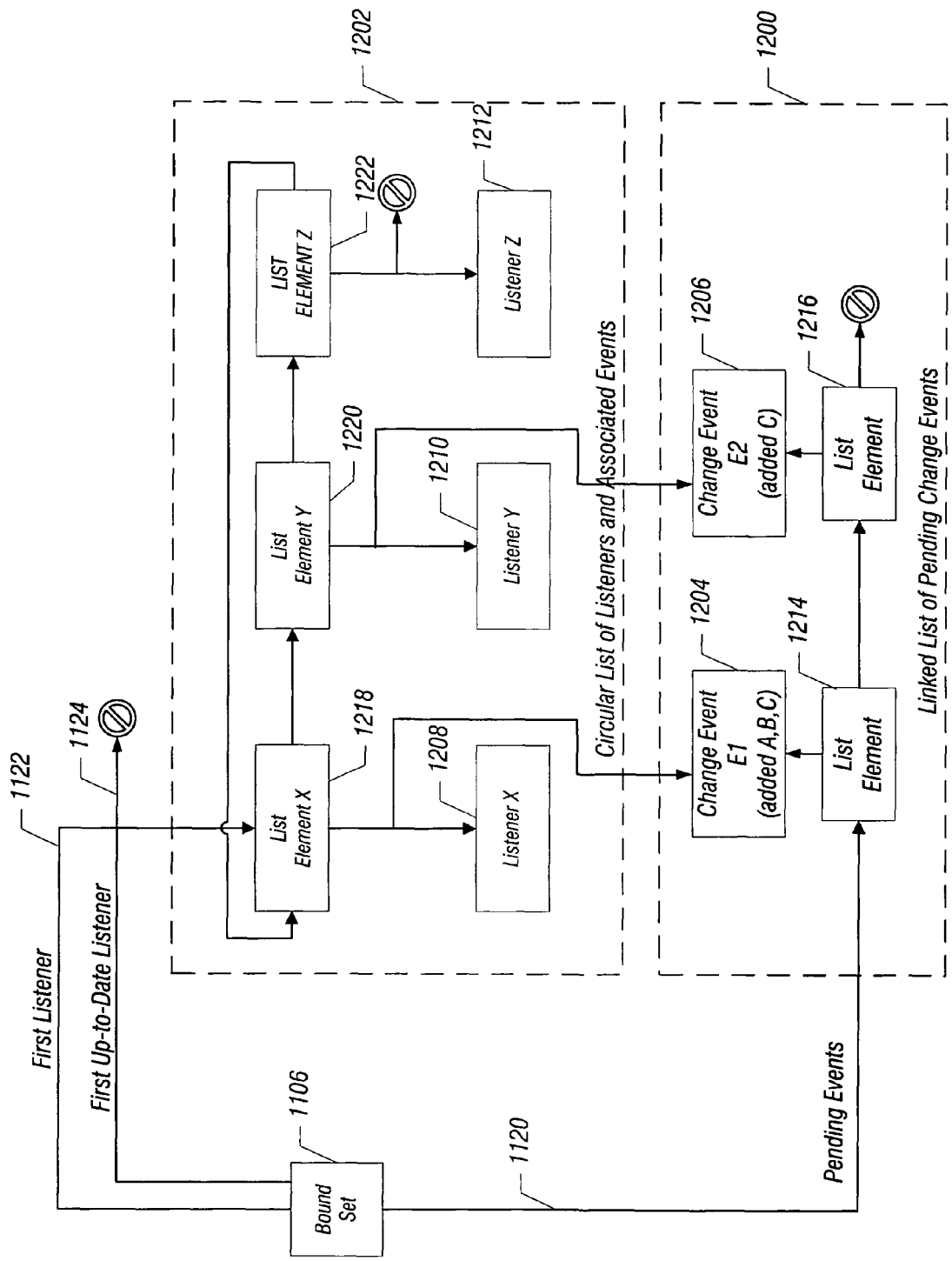
FIGS. 14A-14B are block diagrams illustrating example arrangements of a bound set, a circular linked list of listeners and associated events, and a linked list of pending change events, in accordance with an embodiment.

FIG. 14A shows an example arrangement of a first list 1200 of pending change events and a second list 1202 of listeners (and their associated change events). The FIG. 14A shows example states of the first and second lists 1200 and 1202. The FIG. 14A embodiment is based on the FIG. 13A embodiment (which contains bound set 1106). Note that the bound set 1106 can be replaced with the bound set 1112 and the change support object 1114 of FIG. 13B if the FIG. 13B embodiment is used instead. In the example of FIG. 14A, two change events 1204 (event E1) and 1206 (event E2) have been created to represent two distinct groups of changes to the bound set 1106. Also, three listeners 1208 (listener X), 1210 (listener Y), and 1212 (listener Z) have been registered for the bound set 1106.

The list 1200 of change events, according to one embodiment, is a linked list of pending change events to which the bound set 1106 points (at 1120). A "linked list" means that the elements of the list are linked in some order by means of a reference from each element to the next element, with the last element indicating that there is no further element. In alternative embodiments, other ordered structures, such as vectors or arrays, may be used. In the example depicted in FIG. 14A, two change events E1 (1204) and E2 (1206) are contained in the list 1200 of change events. Change event E1 represents three changes that have been made to the bound set 1106 addition of item A, item B, and item C). Listener X (1208) points to change event E1. Change event E2 represents another distinct change (addition of item C) to the bound set 1106. Listener Y (1210) points to change event E2.

Note that change event E1 represents changes made to the bound set 1106 since listener X was last notified of another change or, if the listener X has not yet been notified of a change, since listener X was registered as a listener with bound set 1106. Similarly, change event E2 represents a change made to the bound set 1106 since the corresponding listener Y was last updated. "Updating" a listener means providing a notification of one or more changes made to the bound set 1106 since the listener was last notified of a previous group of one or more changes.

Also note that change event E2 was created after creation of change event E1. The addition of item C to the bound set 1106 is reflected in both change events E1 and E2. The change "addition of C" is a single change made to bound set 1106 that is contained in both change events E1 and E2. Change events E1 and E2 contain distinct groups of one or more changes. At the time that change event E1 was created, the bound set 1106 did not contain items A, B, or C. In contrast, at the time that change event E2 was created, the bound set 1106 contained items A and B (previously added) but did not contain item C.

In other words, when change event E1 was created, the bound set 1106 contained a first content. Later, when change event E2 was created, the bound set 1106 contained a second, different content (namely the first content plus the changes made in change event E1). Thus, plural change events in the linked list 1200 represent distinct groups of changes made to distinct contents of the bound set 1106. As will be described below, this state of affairs most likely came about due to the addition of item C to bound set 1106 taking place during the response of listener Y to notification of the addition of items A and B.

The linked list 1200 is represented by list elements 1214 and 1216 (which are data structures for representing the list 1200 and for tracking an order of respective change events). The change event 1204 is associated with list element 1214, and the change event 1206 is associated with list element 1216. If additional change events are represented in the list 1200, then additional list elements would be present in the list 1200. The arrow pointing from list element 1214 to list element 1216 indicates that, in the linked list 1200, change event E1 occurred before change event E2.

The second list 1202 is a circular list of listeners and associated events. The list 1202 is circular in the sense that the last element, list element 1222, rather than indicating that it is the last element, contains as its "next element" reference a pointer to the first element, list element 1218. This results in list elements (e.g., 1218, 1220, 1222) being connected in a loop. Each list element refers to a listener and, in some cases, to a change event, where each list element represents an association between a listener and a change event. In the example of FIG. 14A, the list 1202 includes listeners 1208, 1210, and 1212 associated with corresponding list elements 1218, 1220, and 1222. The list elements 1218, 1220, and 1222 also point to respective change events (or null if a change event is not associated with a particular listener). In the example of FIG. 14A, listener X is associated (by list element 1218) with change event E1, listener Y is associated (by list element 1220) with change event E2, and listener Z is not associated with any change event. Even though listener Z is not associated with any change event, the semantics of the structure dictate that listener Z should be notified of change event E2. How this is accomplished is discussed further below. There are other mechanisms other than linked lists for implementing circular lists, including arrays, vectors, and ring buffers. In particular, it may be desirable to implement the circular list as a doubly-linked list (one in which each node refers to the previous node as well as to the next node) to facilitate the removal of nodes.

In the example of FIG. 14A, the First Listener pointer 1122 and First Up-to-Date Listener pointer 1124 can point to null (Ø) or to one or more of the listeners 1208, 1210, and 1212. The pointers 1122 and 1124 are used to keep track of the first listener (the registered listener that has been on the list 1202 the longest since the time the listener was added or last invoked) and the first up-to-date listener (the oldest listener for which the set has not changed since the listener was added or last invoked). As noted above, if the First Listener pointer 1122 and First Up-to-Date Listener pointer 1124 point to the same listener in the list 1202, then all listeners have been updated with change events for all changes to bound set 1106 from the time they were registered up until the present. While the (circular) order of the listeners in the circular list of listeners 1202 does not change (other than by the registration and unregistration of listeners), the notion of which listener is first is constantly changing based on the addition of change events and updates (as discussed further below).

At some point, described below, logic in the system decides that it is time to inform the registered listeners of a bound set 1106 about recent changes. This process of informing the listeners is referred to as "firing" the change events associated with the bound set 1106 and takes the form of iterating over the list 1202 of listeners. Each iteration causes invocation of a listener to update the listener with the corresponding change event. Note that an invoked listener can itself make further changes to the bound set 1106, which would result in nested iterations to be performed for notifying listeners of the further changes.

The registration of listeners and invocation of events are defined by the bound set itself (e.g., 1106 in FIG. 13A or 1112 and 1114 in FIG. 13B), which means that external code does not have to be defined to determine when to register listeners and invoke events. Also, from the perspective of users (a user can be another software module) of the bound set, the bound set provides the interface of and can be treated as a normal set, and the firing of change events is a consequence of normal set modification operations.

Change events that are propagated contain not just information that a change has occurred to the set, but also information indicating what change(s) was (were) made (e.g., items A, B added; item C added, etc.). Information regarding what changes were made is useful in some contexts.

A further efficiency provided by some embodiments is that it is possible for a user (which may be a software module) of the set to specify that a potentially complex set of changes, implemented perhaps as multiple separate invocations of the set's modification methods, should be considered as a single complex change. This enables the system to ensure that each registered listener is invoked at most once (and not at all if the net effect of all changes is to leave the set unchanged) with a change event that reflects all of the modifications. This avoids the computational expense of having each listener informed of each separate individual change and, in particular, allows listeners to avoid doing work that will have to be undone or redone when the next invocation occurs.

As mentioned above, the information provided to each listener by its respective change event contains a description of all and only the changes made to the bound set between the last invocation of the listener and the present (or since the time the listener was registered with the bound set if this is the first time the listener has been invoked).

Enhanced efficiency is achieved by some embodiments by further detecting when changes made to a bound set cancel each other out. If changes to the bound set cancel each other out, then the listener is not called since the net effect is that no real change has been made to the bound set since the last time the listener was invoked (or since the time the listener was registered), and the change event provided to the listener would necessarily contain a description of no change. For example, since the last time a listener was called, item A may have been added to the set, followed by removal of item A from the set. These two changes to the set constitute one example of changes that cancel each other out resulting in no actual change to the set. Note that because different listeners may have registered or last been invoked when the bound set contained different contents, a particular modification may result in a change from the point of view of one listener and no change from the point of view of another.

In some embodiments, a listener can easily remove itself (either by explicitly un-registering itself or by indicating a desire to do so by returning a particular value when invoked) from the list 1202 so that the listener is no longer notified of changes to the set. Often, a listener may only wish to fire once, after which the listener can remove itself from the list 1202. An un-registered listener will not be invoked as a result of future changes to the bound set 1106. In the preferred embodiment, an un-registered listener will also not be invoked as a result of changes that have already occurred but which that particular listener has not been invoked with a change event.

The change event object 1250 according to an embodiment is depicted in FIG. 6. The change event object is associated with the following objects: Source, Added, Removed. The Source object is the bound set which was modified. The Added object is an ordinary set which contains those items that have been added to the bound set during the time period described by the change event. The Removed object is an ordinary set which contains the items that have been removed from the bound set. In some embodiments the change event object 1250 is also associated with a Boolean "Cleared" parameter, for which a "true" value indicates that the modifications to the set involved (perhaps among other things) clearing the set. This parameter allows certain optimizations on the part of the listener in some situations. The change event object 1250 also contains another Boolean field, "worthRaising", which is used by the propagation mechanism described below to keep track of whether changes cancel one another out and that therefore listeners associated with the event should not be invoked.

The following defines various components using Java code or pseudocode, according to one example embodiment. Note, however, that the various components discussed can alternatively be implemented in other programming languages, such as C++, Perl, Python, Lisp, Smalltalk, or other software languages with appropriate modifications caused by the syntax of and programming style encouraged by the chosen language or languages. The definitions of various components provided below are intended as examples—in other embodiments, other definitions can be provided to define bound sets and associated objects and methods. In particular, what are, due to the vagaries of the Java programming language, referred to as "interfaces" or "classes" may, in a different language be considered to be the same type of thing—e.g., in C++ they would all be classes, while other languages may use still other words to describe the basic class construct. For example, in certain dialects of Lisp, they would be called "flavors". Also, some of the following code would be organized differently in languages which allow (as Java does not) a class to multiply inherit from more than one class or allows (as Java did not until recently) a class to be parameterized (as a "template") by one or more other classes. The example implementation assumes that the bound set can contain elements of any type (denoted in Java by the Object class). In other embodiments, the implementation may be specialized to allow the bound set to contain only elements of a certain type or to be a templated implementation parameterized by the type instances are allowed to contain.

In one example, the bound set 1112 of FIG. 13B (or, equivalently, the bound set 1106 of FIG. 13A) is an instance of an interface defined as follows:

```
interface BoundSet extends Set{void addContentsChange-
    Listener(ContentsChangeListener lstnr);
  void  removeContentsChangeListener(ContentsChange-
    Listener lstnr);
  void removeContentsChangeListenerByClass(Class c);
  boolean hasContentsChangeListenerO;
  void beginChange( )
  void endChange( )
}
```

The bound set interface (called "BoundSet") extends (derives from) another interface, called "Set," which is well defined by Java. (Similar interfaces or classes may be provided by other languages, by libraries, or written by programmers.) An instance of a first interface that extends a second interface provides all methods of both interfaces. Thus, in the example definition of BoundSet above, the BoundSet interface inherits all methods of the Set interface, which may include methods to add elements to or remove elements from the set, query whether an object is an element of the set, iterate over all elements of the set, or obtain the number of elements in the set. The Set interface may further derive from other interfaces, whose methods objects implementing the BoundSet interface would also provide. In addition, the BoundSet interface also declares additional methods (including the addContentsChangeListener( ), removeContentsChangeListener( ), removeContentsChangeListenerByClass( ) hasContentsChangeListener( ), beginChange( ) and endChange( )methods).

Since Java does not allow interfaces to have implementation, an implementation for BoundSet according to one embodiment as shown in FIG. 13B is defined below (as the AbstractBoundSet class):

```
abstract class AbstractBoundSet extends AbstractSet
    implements BoundSet{
  protected ContentsChangeSupport ccSupport;
  protected  ContentsChangeSupport getSupportObject( )
    { . . . }
  protected void propagateAdd(Object o) { . . . }
  protected void propagateAddAll(Collection coll) { . . . }
  protected void propagateClear( ){ . . . }
  protected void propagateRemove(Object o) { . . . }
  protected  void  propagateRemoveAll(Collection  coll)
    { . . . }
  // plus BoundSet methods}
  . . .
}
```

The class AbstractBoundSet class implements most of the BoundSet interface. In this implementation, AbstractBoundSet extends a standard Java class named AbstractSet. The "abstract" modifier on the class definition implies that the definition is incomplete, that further definition will be provided to fully define a class to the point at which instances can be created. In particular, this class does not provide implementations of methods that enable the class to behave as an ordinary set. Some of these methods will contain code (described below) to correctly implement some embodiments.

The bound set interface (BoundSet) includes methods addContentsChangeListener (for registering a listener "lstnr"), removeContentsChangeListener (for un-registering or removing a single listener "lstnr"), removeContentsChangeListenerByClass (for un-registering or removing all listeners of a particular class without having to know their individual identities), hasContentsChangeListener (for determining if any listener is associated with the bound set), beginChange (to begin a group of one or more changes), and endChange (for ending the group of one or more changes).

As described further below, the beginChange and endChange methods allow multiple changes to be made to a bound set before a listener (or plural listeners) are notified of any of the changes in the group of one or more changes. The use of the beginChange and endChange methods allows for greater efficiency in notifying listeners after several changes are made to the bound set (rather than providing a notification for each change, which would result in substantially larger number of invocations of listeners).

The AbstractBoundSet class has a member of type ContentsChangeSupport, which is the change support object 1114 of FIG. 13B. The AbstractBoundSet class delegates various methods as well as the methods declared by BoundSet to the ContentsChangeSupport object. The AbstractBoundSet class further declares that each instance contains a (possibly and initially null) pointer named "ccSupport", which is a pointer to the change support object 1114. Thus, in FIG. 13B, the ccSupport pointer is labeled "Support". The AbstractBoundSetClass also defines a method getSupportObject that is called to determine if the instance's ccSupport points to a change support object. If a change support object does not exist for the bound set, then the getSupportObject method creates the change support object and sets the instance's ccSupport pointer to refer to it. The methods and fields declared by the AbstractSupportObject class are declared to be "protected", which in Java means that they are not considered to be part of the public interface of instances of the class but are rather intended to be used by implementations of subclasses. In other embodiments, other protection levels can be chosen, and implementations in other programming languages will choose from among the protection levels provided by those languages if the languages have a concept of protection.

Alternatively, in an implementation of the embodiment depicted in FIG. 13A, there would be no separate ContentsChangeSupport object and no ccSupport pointer or getSupportObject method. Rather the methods of AbstractBoundSet (including those inherited from BoundSet) would be defined by AbstractBoundSet rather than being delegated to a separate object. The advantage of having the separate object is that it reduces overhead by allowing bound set objects to be smaller in the common case in which no listeners are actually registered.

The other methods of the AbstractBoundSet implementation include methods called by other methods that modify contents or note that contents have been modified: propagateAdd (for propagating the addition of an object "o"), propagateAddAll (for propagating the addition of a collection of objects "coll"), propagateClear (for propagating the clearing of a bound set); propagateRemove (for propagating the removal of an object "o"), and propagateRemoveAll (for propagating the removal of a collection of objects "coll").

In other embodiments, additional methods may be provided to atomically combine the propagation of the removal of elements and the information that such removal constitutes clearing the set. In yet further embodiments, no method may be provided specifically for propagating the notion that the bound set has been cleared. In some embodiments only the propagation methods for the addition or removal of entire collections or of single elements, but not both, may be provided.

The propagate methods that are part of the AbstractBoundSet implementation are used by subclasses for propagating a change made to a bound set to listeners. One such subclass is BoundHashSet, which is logically a subclass of both AbstractBoundSet and HashSet (which is a set that uses hash tables, as defined by Java) but which, because of the rules of the language, which rule out such "multiple inheritance" is implemented by extending HashSet and incorporating the details of the definition of AbstractBoundSet. (In an alternative embodiment, AbstractHashSet could extend AbstractBoundSet and delegate all of its set-related methods to a HashSet member.) A "subclass" is a class that inherits from another class. On the other hand, a superclass is a class that is inherited by another class. Thus, HashSet is a superclass of BoundHashSet.

Implementing one subclass with BoundHashSet is merely an implementation detail that illustrates one example embodiment. Such implementation details can be omitted or changed in other embodiments.

The BoundHashSet subclass overrides several basic set operations, (defined by HashSet), providing its own implementation, which will be the one used by instances of BoundHashSet. These overridden methods include a method add( ) The method add( ) is changed as follows:
    boolean add(Object o){
    boolean val=super.add(o);
    If (val){
       propagateAdd(o);
    }
    return val;
    }
In the subclass BoundHashSet, the add( )method first delegates to the add( )method of the superclass HashSet, in the call to super.add(o) (in other words, the add( )method of the superclass HashSet is invoked, actually adding the Object o to the set's underlying representation, as defined by the HashSet class). If super.add( ) returns true, then, by the semantics of the standard Java Set interface, that means that an addition has actually resulted in a change to the bound set, and that the addition should be propagated to any listeners, by invoking propagateAdd(o).

The BoundHashSet overrides the remove( )method in similar fashion, as follows:
    boolean remove(Object o) {
    boolean val=super.remove(o);
    If (val) {
       propagateRemove(o);
    }
    return val;
    }
Note that the add( ) and remove( )methods of BoundHashSet return the "val" value returned by the respective superclass add( ) or remove( )method since the ones calling add( )

and remove( ) will expect the return value to declare whether or not the addition or removal resulted in a change to the bound set (considered as an ordinary set).

More generally, the add( ) and remove( )methods are defined to add or remove objects from a set, with the add( ) and remove( )methods calling respective propagateAdd( ) and propagateRemove( )methods in response to a change (adding an object or removing an object) to the set.

To add multiple items (in a collection "c") to a bound set, the following addAll(Collection c) (overriding the addAll method of HashSet) is called:

```
boolean addAll(Collection c) {
  if (!hasContentsChangeListener(( ){
    return super.addAll(c);
  }
  beginChange( );
  boolean val=super.addAll(c);
  endChange( );
  return val;
```

As depicted in FIG. 15, the addAll( ) method of BoundHashSet calls the hasContentsChangeListener( )method to determine (at 1302) if the bound set has any listeners registered. If not, then the hasContentsChangeListener( )method will return a false value. If there are no registered listeners, then the superclass's addAll(c) method is delegated to and the value returned is returned as the value of the method. This delegation will (because of the way HashSet is implemented) result in multiple calls to the instance's add( )method, one per element of the collection. In other words, the addition of items in collection c can be made to the bound set, by calling (at 1304), in the superclass's addAll( )method, the add( )method multiple times to add the items. This delegation will result in multiple calls to propagateAddO, but since there are no listeners, this will not result in any further activity.

However, if there are any listeners registered, then the call to the superclass method addAll(c), super.addAll(c), is "wrapped" in a "change region." The "change region" is defined by beginChange( ) and endChange( ) with the call of super.addAll(c) invoked within this change region. The purpose for wrapping the call of super.addAll(c) in the change region is so that multiple changes (represented by adding multiple items to the bound set) can be made to the bound set without creating multiple change events and calling listener(s) multiple times, which would be inefficient. Note that in most scenarios, a listener does not care to be notified about each individual change made to a bound set, but rather, the listener typically wishes to learn that some change has been made to the set (and what those changes are).

In accordance with some embodiments, one change event is created and one call of the listener is performed when making the collection of changes to make the change notification process more efficient. As depicted in FIG. 15, this is accomplished by first calling (at 1306) beginChange( ) to start the change region, calling (at 1308) add( ) multiple times to add the multiple items, and then calling (at 1310) the endChange( )method to end the change region. Since HashSet's addAll(c) method is implemented by calling the add(o) method multiple times, with "o" being an object from collection "c", this may result in multiple calls of propagateAdd( ). However, the ContentsChangeSupport logic ensures that no events are actually propagated until endChange( ) is reached. (The principal reason for checking whether listeners exist is that in this embodiment the call to beginChange( ) will call getHandlerObject( ) and will result in the creation of a ContentsChangeSupport object for the bound set even if there are no listeners. In the alternative embodiment depicted in FIG. 13A, in which there is no separate ContentsChangeSupport object, the call to hasContentsChangeListener( ) can be omitted and beginChange( ) and endChange( ) can be called unconditionally.)

Similarly, removing multiple items from the set is performed by calling the removeAll(Collection c) method defined by BoundHashSet:

```
boolean removeAll(Collection c){
  if (!hasContentsChangeListener(( ){
    return super.removeAll(c);
  }
  beginChange( );
  boolean val=super.removeAll(c);
  endChange( );
  return val;
```

More generally, the addAll( ) and removeAll( )methods are called to add or remove a collection of objects from a set—the addAll( ) and removeAll( )methods contain logic to wrap multiple changes (multiple additions or multiple removals) in a change region that prevents propagation of the changes until all of the collection of objects have been added to or removed from the set.

As indicated by the Java code above, when an item is added to a set (by using either the add( )method or the addAll( )method), a propagateAdd( ) method (defined as either part of the bound set or the change support object), is called to propagate the item addition event. Similarly, when an item is removed from a set (by using either the remove( )method or the removeAll( )method), a propagateRemove( ) method (defined as either part of the bound set or the change support object), is called to propagate the item removal event.

For the clear( )method, which clears a set, the old content of the set is preserved so that an event can refer to old content as removed items:

```
void clear( ){
  if (!hasContentsChangeListener(( ){
    super.clear( )
    return;
  }
  Collection oldContents=Arrays.asList(toArray(( );
  Super.clear( );
  propagateClear(oldContents);
```

In the clear( )method, if there are no listeners, the superclass clear( ) method, super.clear( ) is invoked to clear the set. However, if there are any listeners, the original content of the set is copied into a collection oldContents, followed by calling super.clear( ) to clear the contents of the set, and calling propagateClear(oldContents) to propagate the old content of the set to listeners.

Effectively, the clear( )method is similar to the remove( )method except that the entire content of a set is removed and the original content of the set is maintained in a data structure, oldContents.

The above has described the definition of a bound set (and various components associated with a bound set) to enable the propagation of changes to bound set listeners. The event logic is next discussed below.

In the code for the BoundSet abstract interface set forth above, the addContentsChangeListener and removeContentsChangeListener methods are used to register and unregister, respectively, an object that implements the ContentsChangeListener interface. ContentsChangeListener is an interface defined as follows:

```
interface ContentsChangeListener{
  boolean contentsChanged(ContentsChangeEvent e);
}
```

The interface ContentsChangeListener is called when contents of the corresponding set has changed. The change or changes made to the set are passed through a change event (event "e" of type ContentsChangeEvent) by invoking a method ContentsChange( ) The return value from the ContentsChange( )method is a value that indicates whether a listener should be retained as a listener by the bound set (return value is true) or removed as listener (return value is false). A return value indicating whether a listener should be retained or removed is actually set by the listener itself—if a listener wishes to un-register itself as a listener of a particular set, it would cause the ContentsChange( )method to return a false return value. This provides a convenient mechanism for the listener to un-register itself so that the listener is no longer notified of subsequent change events.

The ContentsChangeEvent class has the following definition:

class ContentsChangeEvent{
    BoundSet getSource( );
    Set getAdded( );
    Set getRemoved( );
    boolean is Cleared( );
    ContentsChangeEvent(BoundSet Source);
    void add(Object o);
    void addAll(Collection c);
    void remove(Object o);
    void removeAll(Collection c);
    void setCleared( );
    boolean is WorthRaising( );
    private final BoundSet source;
    private HashSet added;
    private HashSet removed;
    private boolean cleared=false;
    private boolean worthRaising=false;
    }

Figures 18, 19:
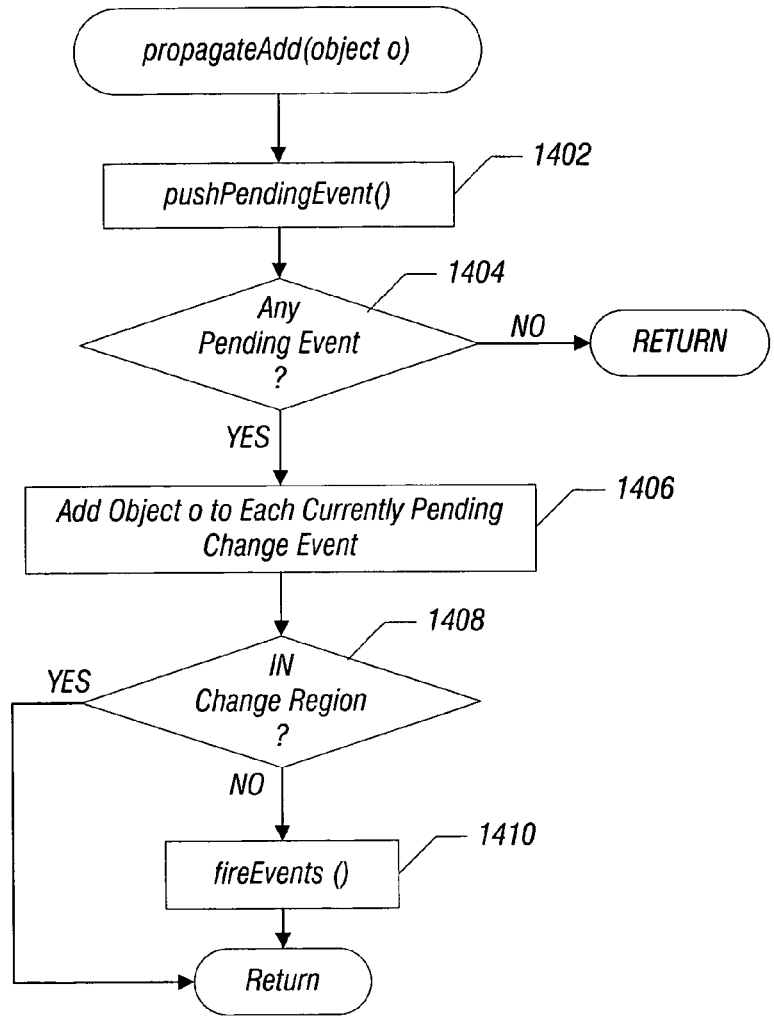
FIG. 18 depicts a change event object according to an embodiment.
FIG. 19 is a flow diagram of a process performed by a software method for propagating the addition of an object, according to an embodiment.

The last five lines of the code for the ContentsChangeEvent class represent elements of the change event depicted in FIG. 18.

The following methods defined in the ContentsChangeEvent class are used by listeners to obtain various information regarding a change event: getSource( ) to obtain the source of the event, (which is a bound set as depicted in FIG. 18); getAdded( ) (which obtains the Added set as depicted in FIG. 18); getRemoved( ) (which retrieves the Removed set as depicted in FIG. 18); and is Cleared( ) (which determines whether the bound set was cleared first based on the cleared parameter depicted in FIG. 18). The source bound set is associated with the ContentsChangeEvent object when the latter is created. Alternative embodiments may omit these methods and provide direct read access (in some embodiments denying direct write access) to the corresponding state information.

The methods add(Object o), addAll(Collection c), remove(Object o), removeAll(Collection c), and setCleared( ) are used to modify the state of the ContentsChangeEvent. These methods are intended to be called only by ContentsChangeSupport objects (or in embodiments which lack ContentsChangeSupport objects, BoundSetObjects) from within the various propagate methods. In embodiments in languages which allow such specification, the protection of these methods may be set so as to only allow calls from such objects or from within such methods.

The is WorthRaising( )method returns the value of the worthRaising parameter. It is intended to be called only during the fireEvents( )method described below. (Alternative embodiments may provide direct read access to the parameter.) The value returned by the is WorthRaising( )method reports the condition of at least one of the Added set and the Removed set (FIG. 18) existing and being non-empty. In an alternative embodiment, the worthRaising parameter is omitted and the is WorthRaising( )method tests this condition directly. The ContentsChangeEvent guarantees that no item is in both the Added set and the Removed set. To ensure this, the add( )method first checks to see whether the item being added is already contained in the Removed set. If the item is in the Removed set, then what is being added is something that was previously removed, so the event now reflects the fact that the two actions cancelled one another. In such a case, the item is removed from the Removed set and not added to the Added set. If such a removal results in both sets being empty, the worthRaising flag is cleared (set to false). However, if the item had not previously been removed (that is, the item is not in the Removed set), then the item is added to the Added set (which is created if not already there). Because there is now an item in the Added set, the event is flagged as being worth raising by setting worthRaising to true. Similar logic is applied in response to the remove( )method, addAll( ) and removeAll( )methods.

The change support object (named "ContentsChangeSupport" in the definition of the AbstractBoundSet class above) contains four components: the bound set to use as a source for events created by the change support object; a change level parameter (changeLevel); a circular list of listeners and associated events; and a linked list of pending events.

In the embodiment depicted in FIGS. 13A and 14A, the change support object actually does not exist. In such an embodiment, the components listed above are part of the bound set instead of the change support object.

As shown in FIG. 16, the changeLevel parameter, which is set to have a value of zero at the time the ContentsChangeSupport object is created, is incremented (at 1312) each time the beginChange( )method is called. As depicted in FIG. 17, each time the endChange( )method is called, the parameter changeLevel is decremented (at 1320). Thus the changeLevel counts the number of calls to beginChange( ) that have not been matched by calls to endChange( ). The endChange( ) routine also determines (at 1322) if the parameter changeLevel parameter is equal to zero. If not, then control returns. However, if the changeLevel parameter is equal to zero, then the BoundSet is no longer within a complex change and a method fireEvents( ) is called (at 1324), which performs notification of registered listeners of pending events in the linked list 1200 (FIG. 14A) of change events. The process for the fireEvents method is described in connection with FIG. 20 below.

As depicted in FIG. 19, the propagateAdd( ) method of the AbstractBoundSet class, which delegates control to the similar method on the AbstractBoundSet's associated ContentsChangeSupport object if such exists, (invoked from within an add( )method or addAll( )method) propagates addition of an object "o" to the set. In one example embodiment, the Java code for the propagateAdd( ) method is provided below:

Void propagateAdd(Object o){
    pushPendingEvent( );
    if (pendingEvents==null) {
        return;
    }
    for    (Iterator    iter=pendingEvents.iterator(    );
        iter.hasNext( );){
        ((ContentsChangeEvent) iter.next( )).add(o);
    }

```
if (changeLevel==0){
    fireEvents( );
}
}
```

The propagateAdd( ) method first invokes (at 1402) a push-PendingEvent( ) method, which checks to see if there are any up-to-date listeners by checking to see whether the First Up-to-Date Listener pointer 1124 (FIG. 14A) points to a list element rather than to null. If so, then an event has to be associated with the up-to-date listeners to be passed to them when next invoked and to reflect all modifications to the bound set starting with the current modification, and the pushPendingEvent( ) method creates the corresponding, initially-empty, event. The created event is associated with the first up-to-date listener (pointed to by the First Up-to-Date Listener pointer 1124) by modifying the pointed-to list element to point to it. After creating this new change event, the pushPendingEvent( )method indicates that there are no longer any up-to-date listeners, by causing the First Up-to-Date Listener pointer 1124 to point to null. The newly created event is added to the end of the list 1200 (FIG. 14A) of pending events by causing the previously last element of this list to point to a newly created list element that refers to the newly created event. In an alternative embodiment, distinct new events may be created and associated with each previously up-to-date listener.

Upon return from the pushPendingEvent( )method, the propagateAdd( ) method determines (at 1404) if there are any pending events. If not, that means that there are no registered listeners for the set, so nothing needs to be done and control returns from the propagateAdd( ) method. However, if any pending event is detected to be present at 1404, then the propagateAdd( ) method adds (at 1406) object "o" to each currently pending change event. Addition of object "o" to each currently pending change event includes adding the object "o" to any new change event newly created by the PushPendingEvent( )method.

Next, the propagateAdd( ) method determines (at 1408) if the system is currently in a change region (indicated by the parameter changeLevel not equal to zero). As noted above, a change region (defined by calls to beginChange( ) and endChange( )) means that multiple changes are being made to a bound set. To avoid multiple calls to a listener and multiple notifications, the system waits until the system is no longer in a nested change (changeLevel equal to zero) before calling the fireEvents( )method (at 1410).

The propagateRemove( )method is similarly defined as follows:

```
Void propagateRemoveObject o){
pushPendingEvent( );
if (pendingEvents==null){
    return;
}
for    (Iterator     iter=pendingEvents.iterator(      );
    iter.hasNext( );){
    ((ContentsChangeEvent) iter.next( )).remove(o);
}
if (changeLevel==0){
    fireEvents( );
}
}
```

The logic flow for the propagateRemove( )method is similar to the logic flow for the propagateAdd( ) method.

The implementation of bound set objects must ensure that any change to the contents of the bound set, when considered as an ordinary set, must result in a call to propagateAdd( ) or propagateRemove( ) In some embodiments there may be ways of making such modifications that do not involve interacting with the BoundSet object directly. For example, in Java, the Collection interface (which BoundSet implements) specifies that all instances implement an iterator( )method to hand out an Iterator object capable of enumerating the elements of the collection in some order. One method an Iterator has to provide is the remove( )method, which removes from the collection the last item enumerated. To provide such an object which maintains the guarantee that propagateRemove( ) is called when an item is removed, the iterator( ) method for BoundHashSet is defined as follows:

```
Iterator iterator( ){
final Iterator iter=super.iterator( );
return new Iterator( ){
    object last;
    public void remove( ){
        iter.remove( );
        propagateRemove(last);
    }
    public boolean hasNext( ){
        return iter.hasNext( );
    }
    public Object next( ){
        return last=iter.next( );
    }
};
}
```

The Iterator returned by the method holds a reference to an Iterator created by its HashSet superclass. This object knows how to actually remove an object from the underlying set. Whenever an element is handed out by the next( )method, the element is remembered in the "last" parameter. Thus when the remove( )method is called, the Iterator knows what object was removed, and this can be passed to the propagateRemove( )method.

Similarly, if a collection's generic interface allows the retrieval of objects that represent subcollections or views on the collection and these objects permit modification of the underlying collection, such objects must ensure that any modifications are correctly propagated.

The fireEvents( )method of the ContentsChangeSupport class is defined as a loop that iterates until all registered listeners (if there are any) are up-to-date. This will happen when either both the First Listener pointer 1122 and First Up-to-Date Listener pointer 1124 are null (there are no registered listeners) or both point to the same listener.

Figure 20:
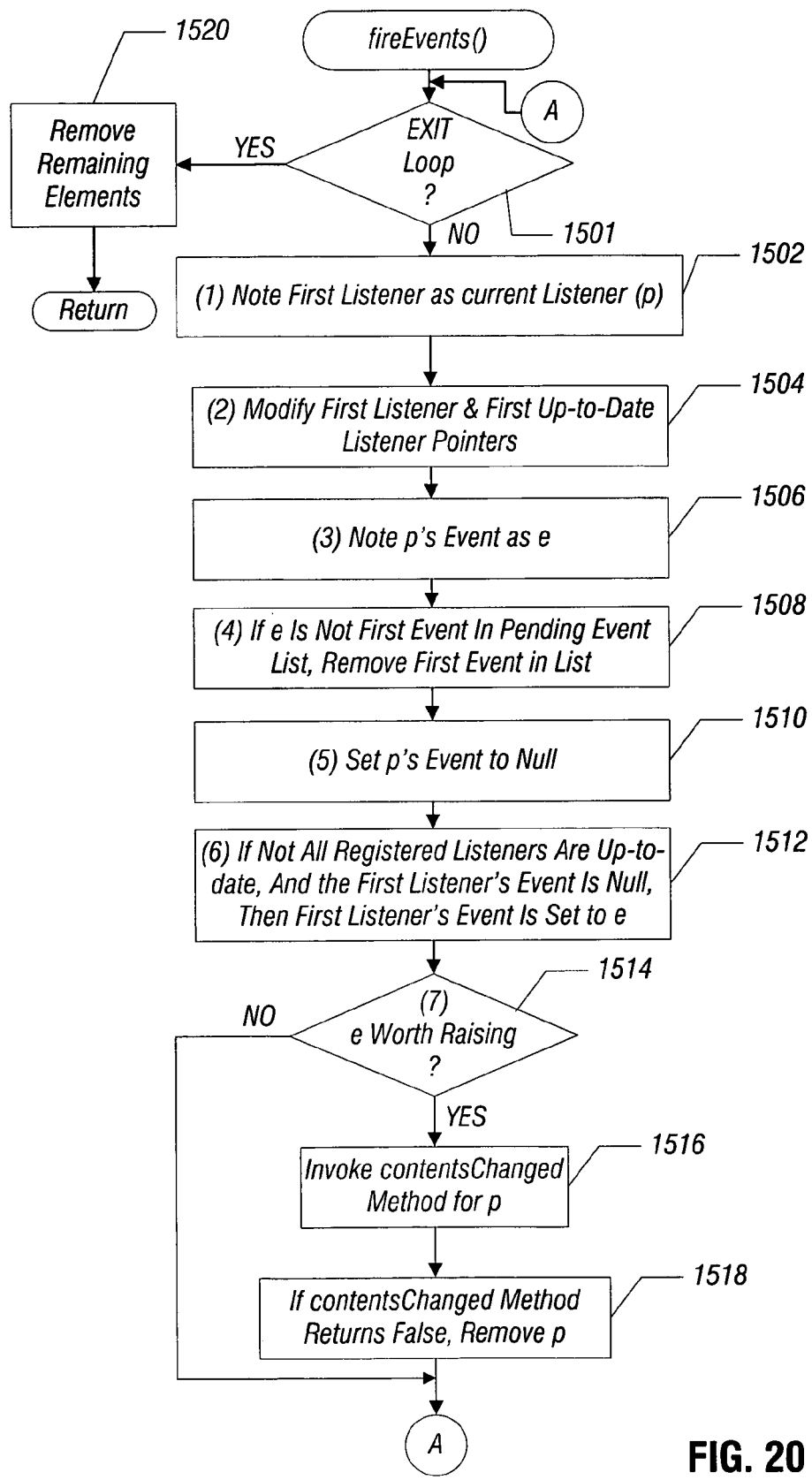
FIG. 20 is flow diagram of a process performed by a software method to notify listeners of events, in accordance with an embodiment.

The process of the fireEvents( )method is described in connection with FIGS. 20 and 21. FIG. 20 shows the general flow of the fireEvents( )method, while FIG. 21 shows an example scenario described in the context of FIGS. 14A and 14B.

In the example of FIG. 14A, there are two change events E1 and E2 that are pending, where event E1 represents the addition of items A, B, and C, while change event E2 represents the addition of item C. In the first iteration ("iteration 1" in FIG. 21) following the state represented by FIG. 14A, the First Up-to-Date Listener pointer 1124 points to a null value, while the First Listener pointer 1122 points to listener X (1208 in FIG. 14A). (In this discussion "pointing to a listener" should be understood to mean "pointing to the unique list element associated with the listener".) In the flow of FIG. 20, numbers in parenthesis, such as (1), (2), etc., correspond to the same reference numbers in the example of FIG. 21. Thus, task 1502 of FIG. 20 corresponds to step (1) each iteration of FIG. 21 task 1504 of FIG. 20 corresponds to step (2) in each iteration of FIG. 21, and so forth.

The fireEvents( )method first determines (at 1501) if the loop should be exited. The loop is exited if the First Listener pointer 1122 and the First Up-to-Date Listener pointer 1124 point to the same listener (or both pointers have a null value). (Upon exiting, any remaining element in the list 1202 is removed (at 1520) from the list). The fireEvents( )method next notes (at 1502) the first listener as being the current listener (by setting a parameter p to the first listener). In the example of FIG. 21, in iteration 1, parameter p is set to indicate listener X (which is the first listener at this time). Next, the fireEvents( )method modifies (at 1504) the First Listener pointer 1122 to point to the next listener (in iteration 1 of FIG. 21, the First Listener pointer is changed to point to listener Y). Effectively, the current listener (p) becomes last listener in the list 1202. If the first up-to-date listener pointer 1124 is null (indicating that there are no up-to-date listeners, the fireEvents( )method also modifies (at 1504) the first up-to-date listener to be the current listener (p) (in FIG. 21, the first up-to-date listener is modified to be set to listener X). Whether or not the first up-to-date listener pointer is modified, the current listener (p) will now be considered to be up-to-date.

The current listener's (p) associated change event is noted as a parameter e (at 1506). In the FIG. 21 example, in iteration 1, e is set to equal change event E1. If e is not the first event in the pending event list (1200 in FIG. 14A), then the first event in the pending event list is removed (at 1508) since there are no further listeners that are associated with it and it can be considered to be garbage (unless other references to it were stored away). In iteration 1 of FIG. 21, since E1 is the first event in the list, no event is removed from the list. Whether or not an event is removed from the list, the event referred to by parameter e will always, at this point, be the first element of the list.

Next, the fireEvent( )method sets (at 1510) p's associated event to null (which in iteration 1 of FIG. 21 means that listener X's associated event is set to null). Setting p's associated event to null is consistent with listener p being up to date (in other words, an up-to-date listener is not associated with any change events).

If not all registered listeners are up-to-date, and the first listener's event is null, then the first listener's event is set to e (at 1512) by the fireEvents( ) method. In iteration 1 of FIG. 21, not all listeners are up-to-date at this time, but listener Y (which is presently the first listener) is not null, which means that nothing is done at 1512. At this point, the listener pointed to by the first listener pointer 1122 is guaranteed to be associated with an event unless it is up-to-date.

Next, the fireEvents( )method determines (at 1514) if event e is worth raising (based on the value of its worthRaising parameter as reported by its is WorthRaising( )method). If not, nothing is done. However, if the event e is worth raising, then the event e is processed. In iteration 1 of FIG. 9, change event E1 is processed because it is worth raising (this is because the Added set, depicted in FIG. 6, is not empty but contains items A, B, C). To process the change event e, the fireEvents( )method invokes (at 1516) the contentsChanged( )method for the current listener p. The contentsChanged( ) passes the change event e (in iteration 1 of FIG. 21 the change event e is E1). If the contentsChanged( )method returns a false value, then the fireEvents( )method removes listener p (at 1518). The false value is returned from the contentsChanged( )method if the listener p decides to un-register itself from being notified of changes made to the bound set 1106 (FIG. 14A).

In the example of FIG. 14A and FIG. 21, at the time right after performance of iteration 1, the First Listener pointer 1122 points to listener Y while the First Up-to-Date Listener pointer 1124 points to listener X. Therefore, the loop is not exited, which means that the fireEvents( )method performs another iteration (iteration 2 in the example of FIG. 21).

In iteration 2, p is set to listener Y (task 1502). The First Listener is set to listener Z and the First Up-to-Date Listener, since it is not null, remains listener X (task 1504 in FIG. 20).

The parameter e is set to point to change event E2 (which is the change event that now has to be propagated to listener Y) (task 1506 in FIG. 20). Since E2 is not the first event in the list 1200, change event E1 is removed from the list 1200 (task 1508 in FIG. 20). Listener Y's associated event is set to null (task 1510 of FIG. 20), which means that listener Y is no longer associated with an event. Since not all listeners are up-to-date at this time, and listener Z's event is null, listener Z's event is set to point to change event E2. Previously, listener Z's change event had pointed to the null value (as depicted in FIG. 14A). Change event E2 is processed (tasks 1514-1518 of FIG. 20) because change event E2 is worth raising (because the Added set corresponding to change event E2 contains item C).

Figure 14B:
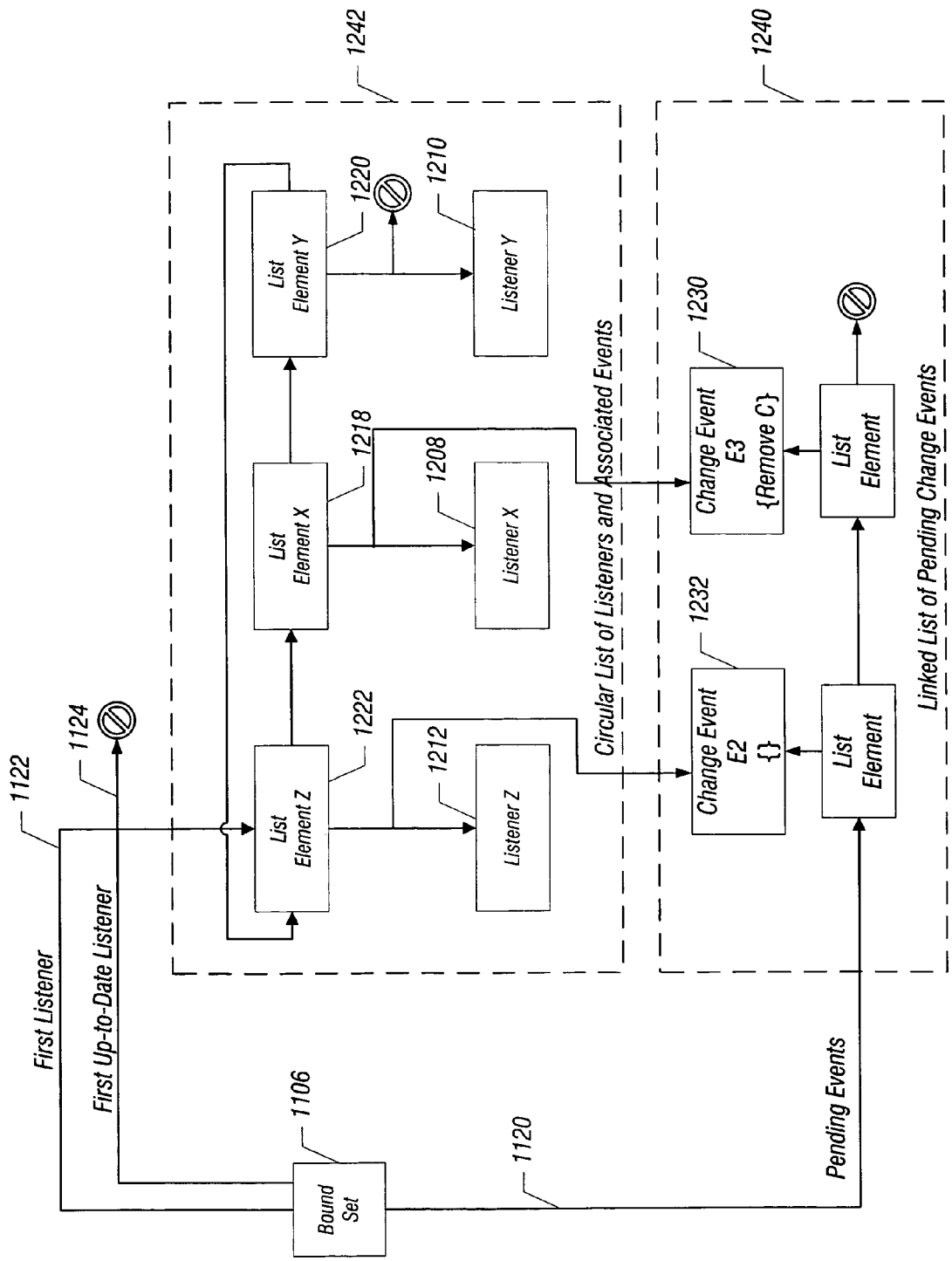

Note that iteration 2 involves a call to listener Y to notify listener Y of change event E2. It is possible that a listener can actually make another change to the bound set 1106. In the example depicted in FIG. 21, as part of iteration 2, listener Y actually removes item C from the bound set, which causes the following to occur. Another change event E3 is created to represent the removal of item C from the bound set. This is depicted in FIG. 14B, where change event E3 is referenced as 1230. Because change event E3 was added, that means that the First Up-to-Date Listener pointer 1124 points to the null value (since no listeners are now up-to-date). Previously, note that listener X was indicated as the First Up-to-Date Listener; but because item C has just been removed from the bound set, which represents another change event, that means that no listeners are now up-to-date.

Item C is also removed from change event E2. Since E2 had previously represented the addition of item C, the subsequent removal of item C means that change event E2 (1232 in FIG. 14B) now represents no modification at all—the bound set is in the same state it was in when listener Z was last invoked. The change events E2 and E3 are now part of a modified list 1240 (modified from the list 1200 in FIG. 14A). Also, circular list 1242 contains a re-arranged order of the listeners.

The fireEvents( ) method is then called by the propagateRemove( )method that was called to propagate the removal of item C from the bound set. This fireEvents( ) call is a nested call, which means that the fireEvents( )method performs several iterations at a nested level that is nested inside the first fireEvent( ) call (iterations 1 and 2 discussed above).

In iteration 1 of the nested level, the First Up-to-Date Listener pointer is null and listener Z is the first listener (which was set in iteration 2 above). In iteration 1 of the nested level, p is set to listener Z (task 1502), and the first listener is set to X and the first up-to-date listener is set to Z (task 1504).

The parameter e is set to E2 (task 1506). Since change event E2 is first in the list 1240 (FIG. 14B), no event is removed from the list 1240 (task 1508). Listener Z's event is set to null (which means that listener Z no longer points to any event) (task 1510).

Since not all listeners are up-to-date, but listener X's event is not null, the condition of task 1512 is not satisfied so nothing further is done here (task 1512). Next, change event E2 is not processed because it is not worth raising (task 1514) from the perspective of listener Z. As noted above, change event E2 represents no modification to the bound set, due to the removal of item C after the addition of item C. The removal of item C after adding item C to the set cancel each other out such that no effective change has been made to the set. Consequently, the worthRaising parameter is set to the false value, and listener Z is not notified of change event E2.

Since not all listeners are up-to-date, iteration 2 of the nested level is performed by the fireEvents( )method. At this time, listener Z is the first up-to-date listener, and listener X is the first listener. The parameter p is set to X (task 1502), and the first listener is set to Y and the first up-to-date listener remains Z (task 1504). The parameter e is set to E3 (task 1506). Since E3 is not the first change event in the list 1240, change event E2 is removed (task 1508). Then, listener X's event is set to the null value (task 1510). Since not all listeners are up-to-date, and Y's event is null (see FIG. 14B), listener Y's event is set to change event E3 so that change event E3 can be propagated to listener Y (task 1512). E3 is processed to notify listener X because E3 is worth raising (removal of item C) (task 1514).

At this stage, listener Z is the first up-to-date listener and listener Y is the first listener (which means that not all listeners are yet up-to-date). In iteration 3 of the nested level, the parameter p is set to Y (task 1502), and the first listener is set to Z and the first up-to-date listener remains Z (task 1504). Parameter e is set to E3 (task 1506), and since E3 is first in the list 1240 (note that E2 was previously removed in iteration 2 of the nested level), no event is removed from the list (task 1508). Listener Y's event is set to null (task 1510). Currently, since the first listener is listener Z and the first up-to-date listener is also listener Z, that means all listeners are up-to-date. E3 is processed (task 1514) because it is worth raising to notify listener Y of the change event E3. Since all listeners are now up-to-date, the loop is exited (at 1501 in FIG. 20) and the single remaining event (E3) is removed (at 1520 in FIG. 20) from the pending event list by setting the pending events pointer to null.

Now control returns from the call to fireEvents( ) nested within the invocation of listener Y in (non-nested) iteration 2. Assuming that the implementation of this listener makes no further changes to the bound set, when it returns control will return to the outer call to fireEvents( ) in task 1518. Since all listeners are still up-to-date, this loop is exited as well.

In addition to simple bound sets which explicitly contain their own contents, it is also possible to define classes that behave as bound sets whose contents are computed based on the state of other objects and which are able to propagate changes to these computed contents when they logically change. In particular, it is possible to define classes whose instances instantiate the logic of set algebra. Set algebra defines set operations (e.g., unions, intersections, etc.) performed on plural sets. In the ensuing discussion, an "algebraic set" refers to a set built up from other sets (also referred to as "subsets") using set algebra. One example of an algebraic set is an immutable set difference object can be implemented as a bound set (referred to as a "difference object set"), constructed to refer to two other bound sets (one of the two bound sets being a base and the other of the bound sets being a filter). The difference object set represents the difference between the base and the filter. The actual set logic is straightforward. To answer whether the difference object set contains an object, the set logic checks to see that the base contains the object and the filter does not.

To iterate over its contents, the difference object set iterates over its base set, skipping over any elements contained in its filter set. "Iterating" over the content of a set refers to enumerating the elements of the set in some order. To compute the size of the difference object set, the difference object set simply iterates over its contents as noted, counting elements and storing the resulting size, which cached value can be returned until the difference object is no longer sure that it knows its size.

The difference object set also responds to changes in the contents of its base and/or filter sets. When constructed, the difference object set registers different listeners with its respective base and filter sets. In response to a change to the base set or filter set, the difference object set first checks to see whether the difference object set has any registered listeners (similar to the logic performed on an individual bound set described above). If there are no listeners, the difference object set simply notes that the difference object set no longer knows its own size (according to one example embodiment). A difference object set indicating that it does not know its own size is used as an indication that there are no listeners associated with the set. In other implementations, other indications that there are no listeners can be employed. The next time the difference object set is asked, the difference object set will have to recompute the size.

If the difference object set does have listeners, the difference object set will propagate any changes. Similar to the propagation logic discussed above for individual sets, the difference object set first calls beginChange( ) to delay any changes until the difference object set has processed the entire event (changes to the base and/or filter). The difference object set then walks through the added and removed items. If an item was removed from the base and the item was not in the filter, the set propagates the removal of the item as a remove and decrements the size (if known). If an item was added to the filter and the base does contain the item, the change is also propagated as a remove. If the resulting size (after all removes have been propagated) is known to be zero, a "clear" is propagated, signaling that all items of the difference object set were removed. Then the items added to the base (or removed from the filter) are walked to determine whether the items should be propagated as additions. Finally, the method endChange( ) is called to allow the propagation of events (unless this is within a nested call).

Similarly, there are two simple forms of set union that can be provided. The most straightforward is the disjoint union set, which is a union of a fixed array of bound sets that are known to be disjoint (have no members in common). The size is computed at construction time as the sum of the sizes of the subsets, and to decide whether an item is a member of the disjoint union set, the subsets are simply asked in turn. Iteration is simply iteration over each subset of the disjoint union set in turn.

The propagation logic (for propagating one or more changes to any subset) is straightforward: (1) beginChange( ) is called; (2) the size of any removed items is subtracted from the size of the union; (3) any removed items are propagated as removed items; (4) if the size of the union is now zero, a clear is propagated; (5) the size of any added items is added to the size of the union; (6) any added items are propagated as added items; and (7) endChange( ) is called.

Another simple form of union is the binary union set, which is the union of two possibly overlapping subsets. Membership is tested by asking the subsets. Iteration is accomplished by iterating over the first subset and then iterating over the second subset but skipping any items present in the first subset. The size, when asked for, is the sum of the sizes of the first and second subsets minus a degree of overlap computed by walking the smaller subset and seeing which items are also in the larger subset. This computed size may be cached until it is not known to be valid in a manner similar to that discussed with respect to the difference object set above.

As with all algebraic sets, a binary union set registers listeners with its subsets. When either subset of the binary union set propagates a change, if there are no listeners for the binary union set, the binary union set simply forgets what it knows about its size (according to one example embodiment). Otherwise, if listeners are registered, the binary union set begins a change by calling beginChange( ) iterates through the changes to the changed subset to propagate additions and removals for items not in the other subset, and ends the change.

A binary intersection can be implemented with similar logic, but with the binary intersection set considering an element to be a member only if it is a member of both of its subsets. Iteration is performed by walking over the smaller subset and testing membership of elements in the larger, and changes to the subsets are propagated.

A more general form of the set algebra classes is a general union. A general union is a generalization of the binary union which contains an arbitrary collection of subsets. The collection of subsets defining a general union set is dynamic, and new subsets can be added or removed by calling addSubset and removeSubset methods, for example. To avoid having to continually walk the list of subsets asking whether elements are members, the general union set will typically be implemented to actually contains its own contents in a normal set and forwards questions about membership and size to this set.

When a general union set is created, the method addSubset( ) is called for each of the initial subsets. When adding any new subset to the general union set, the addSubset( )method first checks to ensure that any new subset defined as part of the general union set is not already in the general union set. If it is not, the general union set begins a change, adds the items of the new subset to the general union set, adds a listener for changes on the subset, and ends the change.

When a subset is removed, the general union set first checks to ensure that the subset to be removed is really a subset. If so, the general union set walks the contents of the subset to be removed and (in one example implementation) asks each of the other subsets whether each item of the subset to be removed is also a member of the other subsets. If not, the item can be removed. If such item is part of another subset, then the item is not removed. In some circumstances it might be more efficient to keep a separate count of the number of subsets that each item appears in. Then it would be a simple matter of decrementing this count each time the item is removed from a subset and propagating a removal when the count hits zero.

When a subset propagates a change, the associated listener simply begins a change and then calls the methods that implement the adding and removing of items of subsets, being careful when removing an item that the source of the change event (corresponding to the removal of the item) is taken to be the subset that the item is being removed from.

Instructions of software routines or modules (such as the rule-based labeling logic 134, case labeling logic 128, inferencing logic 122, training module 114, and categorizer(s) 116 of FIG. 1) are loaded for execution on corresponding processors (e.g., CPUs 108 in FIG. 1). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., storage 106 in FIG. 1), which are implemented as one or more machine-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
storing information representing a hierarchy of categories;
receiving, by at least one processor, an indication that a first case is either a positive case or a negative case for a first category in the hierarchy of categories;
identifying, by inference by the at least one processor, the first case as a positive case or negative case for a second category in the hierarchy based on a relationship of the second category to the first category; and
modifying a training set for the second category based on the identifying.

2. The method of claim 1, further comprising:
modifying a categorizer for the second category based on the modified training set.

3. The method of claim 2, further comprising:
in response to receiving the indication, modifying a training set for the first category; and
modifying the categorizer for the first category based on the modified training set for the first category.

4. The method of claim 1, wherein receiving the indication that a first case is either a positive case or negative case for the first category comprises receiving the indication based on manual selection made in a user interface.

5. The method of claim 1, wherein receiving the indication that a first case is either a positive case or negative case for the first category comprises receiving the indication generated based on applying one or more rules against the first case.

6. The method of claim 1, wherein identifying the first case as a positive case or negative case for the second category in the hierarchy is based on an upward inferencing rule that provides that unless explicitly indicated otherwise, any case that is a positive for a child category of the second category will be inferred to be positive for the second category.

7. The method of claim 1, wherein identifying the first case as a positive case or negative case for the second category in the hierarchy is based on a downward inferencing rule that provides that unless there is an indication that the first case should be considered positive for the second category, the first case will be inferred to be negative if a parent category of the second category considers the first case negative.

8. The method of claim 1, wherein identifying the first case as a positive case or negative case for the second category in the hierarchy is based on a lateral inferencing rule that indicates that any positive case of children categories of a parent category of the second category will be inferred to be a negative case of the second category unless otherwise indicated as a positive case.

9. The method of claim 7, further comprising disabling the lateral inferencing rule for at least some top-level categories in the hierarchy.

10. The method of claim 1, further comprising:
in response to receiving the indication, changing a first bound collection associated with the first category; and
propagating the change of the first bound collection to a second bound collection associated with the first category that contains one of positive cases and negative cases.

11. The method of claim 10, further comprising propagating the change of the second bound collection to a third bound collection associated with the second category in the hierarchy, wherein the identifying is in response to propagating the change to the third bound collection.

12. The method of claim 10, wherein the first bound collection is associated with at least one listener, and wherein propagating the change of the first bound collection to the second bound collection comprises calling the listener.

13. The method of claim 1, wherein receiving the indication is in response to one of: (a) manual labeling of the first case as a positive case or negative case, and (b) labeling of the first case as a positive case or negative case based on one or more predefined rules, the method further comprising:
making a change to a first set in response to receiving the indication;
propagating the change of the first set to one or more other sets to enable the identifying by inference whether the first case should be a positive case or negative case for the second category in the hierarchy.

14. The method of claim 1, wherein receiving the indication comprises receiving an indication that a first case is a positive case, a negative case, not a positive case, or not a negative case for the first category; and
wherein identifying by inference comprises identifying by inference the first case as a positive case, a negative case, not a positive case, or not a negative case for the second category.

15. The method of claim 1, further comprising:
creating a change event in response to the received indication; and
modifying a categorizer from a previously trained state using information contained in the change event.

16. The method of claim 1, further comprising:
further modifying the training set in response to a change in the hierarchy of categories.

17. The method of claim 1, wherein storing information representing the hierarchy of categories comprises storing information regarding at least two of the categories in the hierarchy that are related to each other as a parent and child.

18. A method comprising:
storing information representing a hierarchy of categories;
receiving, by at least one processor, an indication that a first case is either a positive case or a negative case for a first category in the hierarchy of categories;
identifying, by inference by the at least one processor, the first case as a positive case or negative case for a second category in the hierarchy based on a relationship of the second category to the first category;
modifying a training set for the second category based on the identifying;
storing positive and negative cases in respective sets for the first category; and
storing positive and negative cases in respective sets for a third category marked as invisible to indicate that the third category has been deleted from the hierarchy,
wherein at least one of the sets containing positive and negative cases of the third category are inherited by at least one of the sets for the first category.

19. The method of claim 18, wherein the third category is an invisible child of the first category, the hierarchy further containing a fourth category that is a visible child of the first category, the method further comprising:
storing a visible children's positives set associated with the first category that contains positive cases of the fourth category but does not contain positive cases of the third category.

20. A system comprising:
a storage to store information representing a hierarchy of categories;
at least one processor to:
receive an indication that a first case is one of a positive case and negative case for a first category in the hierarchy of categories;
identify, by inference, the first case as a positive case or negative case for a second category in the hierarchy based on a relationship of the second category to the first category;
modify a training set for the second category based on the identifying; and
retrain a previously trained categorizer for the second category based on the modified training set.

21. The system of claim 20, wherein at least two of the categories in the hierarchy are related to each other as a parent and child.

22. A system comprising:
a storage to store information representing a hierarchy of categories;
at least one processor to:
receive an indication that a first case is one of a positive case and negative case for a first category in the hierarchy of categories;
identify, by inference, the first case as a positive case or negative case for a second category in the hierarchy based on a relationship of the second category to the first category;
modify a training set for the second category based on the identifying; and
retrain a previously trained categorizer for the second category based on the modified training set,
wherein the first case is identified as a positive case or negative case for the second category in the hierarchy based on at least one of:
an upward inferencing rule that provides that unless explicitly indicated otherwise, any case that is a positive for a child category of the second category will be inferred to be positive for the second category;
a downward inferencing rule that provides that unless there is an indication that the first case should be considered positive for the second category, the first case will be inferred to be negative if a parent category of the second category considers the first case negative; and
a lateral inferencing rule that indicates that any positive case of children categories of a parent category of the second category will be inferred to be a negative case of the second category unless otherwise indicated as a positive case.

23. A method comprising:

storing information representing a hierarchy of categories;

receiving, by at least one processor, an indication that a first case is either a positive case or a negative case for a first category in the hierarchy of categories;

identifying, by inference by the at least one processor, the first case as a positive case or negative case for a second category in the hierarchy based on a relationship of the second category to the first category;

modifying a training set for the second category based on the identifying; and modifying a categorizer for the second category based on the modified training set, wherein modifying the categorizer comprises modifying the categorizer that is used to decide, based on information associated with a target case, whether the target case is positive or negative with respect to the second category.

24. A system comprising:

a storage to store information representing a hierarchy of categories;

at least one processor to:

receive an indication that a first case is one of a positive case and negative case for a first category in the hierarchy of categories;

identify, by inference, the first case as a positive case or negative case for a second category in the hierarchy based on a relationship of the second category to the first category;

modify a training set for the second category based on the identifying; and retrain a previously trained categorizer for the second category based on the modified training set, wherein the categorizer is configured to decide, based on information associated with a target case, whether the target case is positive or negative with respect to the second category.

* * * * *